US010201014B2

(12) United States Patent
Kadous et al.

(10) Patent No.: US 10,201,014 B2
(45) Date of Patent: Feb. 5, 2019

(54) CONTENTION-BASED CO-EXISTENCE ON A SHARED COMMUNICATION MEDIUM

(71) Applicant: QUALCOMM Incorporated, San Diego, CA (US)

(72) Inventors: Tamer Adel Kadous, San Diego, CA (US); Nachiappan Valliappan, San Diego, CA (US); Ahmed Kamel Sadek, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/234,959

(22) Filed: Aug. 11, 2016

(65) Prior Publication Data

US 2017/0048889 A1 Feb. 16, 2017

Related U.S. Application Data

(60) Provisional application No. 62/204,303, filed on Aug. 12, 2015.

(51) Int. Cl.
*H04L 12/28* (2006.01)
*H04W 74/08* (2009.01)
(Continued)

(52) U.S. Cl.
CPC ... *H04W 74/0816* (2013.01); *H04W 72/0446* (2013.01); *H04W 72/14* (2013.01); *H04W 16/14* (2013.01); *H04W 74/04* (2013.01)

(58) Field of Classification Search
CPC . H04W 16/14; H04W 72/0446; H04W 72/14; H04W 74/04; H04W 74/0816
See application file for complete search history.

(56) References Cited

U.S. PATENT DOCUMENTS

2008/0240032 A1 10/2008 Gelbman et al.
2010/0235705 A1 9/2010 Kim et al.
(Continued)

FOREIGN PATENT DOCUMENTS

WO 2012040520 A1 3/2012
WO 2013087835 A1 6/2013
(Continued)

OTHER PUBLICATIONS

Ericsson, "On SRS Design for Enhanced LAA", 3GPP Draft; R1-165146, 3rd Generation Partnership Project (3GPP). Mobile Competence Centre; 650, Route Des Lucioles; F-06921 Sophia-Antipolis Cedex; France vol. RAN WG1. No. Nanjing. China; May 23, 2016-May 27, 2016, May 14, 2016 (May 14, 2016). XP051096245, Retrieved from the Internet: URL: http://www.3gpp.org/ftp/tsg_ran/WG1_RL1/TSGR1_85/Docs/ [retrieved on May 14, 2016].
(Continued)

*Primary Examiner* — Minh Trang T Nguyen
(74) *Attorney, Agent, or Firm* — Muncy, Geissler, Olds & Lowe, P.C./QUALCOMM

(57) ABSTRACT

Techniques for managing contention on a shared communication medium are disclosed. Various techniques are provided to facilitate aspects such as reference signaling, downlink medium access, uplink medium access, resource reuse, channel structures, acknowledgment schemes, fairness, acquisition, random access, paging, mobility, inter-operator mitigation, and so on for a frame structure implemented on the shared communication medium.

22 Claims, 30 Drawing Sheets

(51) Int. Cl.
*H04W 72/04* (2009.01)
*H04W 72/14* (2009.01)
*H04W 16/14* (2009.01)
*H04W 74/04* (2009.01)

(56) References Cited

U.S. PATENT DOCUMENTS

| | | |
|---|---|---|
| 2010/0322160 A1 | 12/2010 | Yeh et al. |
| 2011/0235555 A1 | 9/2011 | Zhang et al. |
| 2011/0235601 A1 | 9/2011 | Yoo et al. |
| 2013/0258989 A1 | 10/2013 | Ribeiro et al. |
| 2013/0294356 A1* | 11/2013 | Bala ............ H04W 16/14 370/329 |
| 2014/0023004 A1 | 1/2014 | Kumar et al. |
| 2014/0086212 A1* | 3/2014 | Kafle ............ H04B 17/345 370/331 |
| 2014/0293910 A1 | 10/2014 | Li et al. |
| 2014/0301330 A1 | 10/2014 | Lee et al. |
| 2014/0335876 A1* | 11/2014 | Ratasuk ............ H04W 16/14 455/450 |
| 2017/0048047 A1 | 2/2017 | Kadous et al. |
| 2017/0111866 A1 | 4/2017 | Park et al. |
| 2017/0257888 A1* | 9/2017 | Kneckt ............ H04W 74/0808 |

FOREIGN PATENT DOCUMENTS

| | | |
|---|---|---|
| WO | 2014189916 A2 | 11/2014 |
| WO | 2016147129 A1 | 9/2016 |

OTHER PUBLICATIONS

Ericsson, "On UCI Design for LAA", 3GPP Draft; R1-151134, 3rd Generation Partnership Project (3GPP). Mobile Competence Centre; 650, Route Des Lucioles; F-06921 Sophia-Antipolis Cedex; France vol. RAN WG1. No. Paris. France; Mar. 24, 2015-Mar. 26, 2015, Mar. 18, 2015 (Mar. 18, 2015), XP050951459. Retrieved from the Internet: URL: http://www.3gpp.org/ftp/tsg_ran/WG1_RL1/TSGR1_AH/LTE_LAA_1503/Docs/ [retrieved on Mar. 18, 2015].

International Search Report and Written Opinion—PCT/US2016/046764—ISA/EPO—dated Nov. 7, 2016.

* cited by examiner

UPLINK WAVEFORM

ACKNOWLEDGMENT CHANNEL FORMAT

CONTENTION-BASED CO-EXISTENCE ON A SHARED COMMUNICATION MEDIUM

CROSS-REFERENCE TO RELATED APPLICATIONS

The present application claims the benefit of U.S. Provisional Application No. 62/204,303, entitled "Contention-Based Co-Existence on a Shared Communication Medium," filed Aug. 12, 2015, assigned to the assignee hereof, and expressly incorporated herein by reference in its entirety.

The present application is also related to the following co-pending U.S. Patent Application(s): "Contention-Based Co-Existence on a Shared Communication Medium," having U.S. patent application Ser. No. 15/234,991, filed concurrently herewith, assigned to the assignee hereof, and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, contending for access to a communication medium for a first transmission opportunity (TXOP) spanning a first duration; transmitting during the first TXOP a scheduling grant to an access terminal granting the access terminal uplink resources for a second TXOP spanning a second duration; contending for access to the communication medium for the second TXOP; and receiving uplink signaling from the access terminal over the granted uplink resources during the second TXOP.

In another example, a communication apparatus is disclosed. The apparatus may include, for example, at least one processor, at least one memory coupled to the at least one processor, and at least one transceiver. The at least one processor and the at least one memory may be configured to contend for access to a communication medium for a first TXOP spanning a first duration. The at least one transceiver may be configured to transmit during the first TXOP a scheduling grant to an access terminal granting the access terminal uplink resources for a second TXOP spanning a second duration. The at least one processor and the at least one memory may be further configured to contend for access to the communication medium for the second TXOP. The at least one transceiver may be further configured to receive uplink signaling from the access terminal over the granted uplink resources during the second TXOP.

In another example, another communication apparatus is disclosed. The apparatus may include, for example, means for contending for access to a communication medium for a first TXOP spanning a first duration; means for transmitting during the first TXOP a scheduling grant to an access terminal granting the access terminal uplink resources for a second TXOP spanning a second duration; means for contending for access to the communication medium for the second TXOP; and means for receiving uplink signaling from the access terminal over the granted uplink resources during the second TXOP.

In another example, a transitory or non-transitory computer-readable medium is disclosed. The computer-readable medium may include, for example, code for contending for access to a communication medium for a first TXOP spanning a first duration; code for transmitting during the first TXOP a scheduling grant to an access terminal granting the access terminal uplink resources for a second TXOP spanning a second duration; code for contending for access to the communication medium for the second TXOP; and code for receiving uplink signaling from the access terminal over the granted uplink resources during the second TXOP.

In another example, another communication method is disclosed. The method may include, for example, receiving, during a first TXOP spanning a first duration, a scheduling grant from an access point granting uplink resources for transmission by an access terminal; identifying uplink resources corresponding to the scheduling grant in a second TXOP spanning a second duration; and transmitting uplink signaling to the access point over the identified uplink resources during the second TXOP.

In another example, another communication apparatus is disclosed. The apparatus may include, for example, at least one processor, at least one memory coupled to the at least one processor, and at least one transceiver. The at least one transceiver may be configured to receive, during a first TXOP spanning a first duration, a scheduling grant from an access point granting uplink resources for transmission by an access terminal. The at least one processor and the at least one memory may be configured to identify uplink resources corresponding to the scheduling grant in a second TXOP spanning a second duration. The at least one transceiver may be further configured to transmit uplink signaling to the access point over the identified uplink resources during the second TXOP.

In another example, another communication apparatus is disclosed. The apparatus may include, for example, means for receiving, during a first TXOP spanning a first duration, a scheduling grant from an access point granting uplink resources for transmission by an access terminal; means for identifying uplink resources corresponding to the scheduling grant in a second TXOP spanning a second duration; and means for transmitting uplink signaling to the access point over the identified uplink resources during the second TXOP.

In another example, another transitory or non-transitory computer-readable medium is disclosed. The computer-readable medium may include, for example, code for receiving, during a first TXOP spanning a first duration, a scheduling grant from an access point granting uplink resources for transmission by an access terminal; code for identifying uplink resources corresponding to the scheduling grant in a second TXOP spanning a second duration; and code for transmitting uplink signaling to the access point over the identified uplink resources during the second TXOP.

In another example, another communication method is disclosed. The method may include, for example, receiving information over a communication medium in accordance with a Time Division Duplexing (TDD) frame structure defining a series of frames and subframes; determining a set of subframe resources for carrying an acknowledgment channel over the communication medium, wherein the determined set of subframe resources occupies no more than a threshold fraction of the subframe; and transmitting one or more acknowledgment messages associated with the received information over the acknowledgment channel via the determined set of subframe resources.

In another example, another communication apparatus is disclosed. The apparatus may include, for example, at least one processor, at least one memory coupled to the at least one processor, and at least one transceiver. The at least one transceiver may be configured to receive information over a communication medium in accordance with a TDD frame structure defining a series of frames and subframes. The at least one processor and the at least one memory may be configured to determine a set of subframe resources for carrying an acknowledgment channel over the communication medium, wherein the determined set of subframe resources occupies no more than a threshold fraction of the subframe. The at least one transceiver may be further configured to transmit one or more acknowledgment messages associated with the received information over the acknowledgment channel via the determined set of subframe resources.

In another example, another communication apparatus is disclosed. The apparatus may include, for example, means for receiving information over a communication medium in accordance with a TDD frame structure defining a series of frames and subframes; means for determining a set of subframe resources for carrying an acknowledgment channel over the communication medium, wherein the determined set of subframe resources occupies no more than a threshold fraction of the subframe; and means for transmitting one or more acknowledgment messages associated with the received information over the acknowledgment channel via the determined set of subframe resources.

In another example, another transitory or non-transitory computer-readable medium is disclosed. The computer-readable medium may include, for example, code for receiving information over a communication medium in accordance with a TDD frame structure defining a series of frames and subframes; code for determining a set of subframe resources for carrying an acknowledgment channel over the communication medium, wherein the determined set of subframe resources occupies no more than a threshold fraction of the subframe; and code for transmitting one or more acknowledgment messages associated with the received information over the acknowledgment channel via the determined set of subframe resources.

In another example, another communication method is disclosed. The method may include, for example, designating one or more subframes for transmission of discovery reference signaling over a communication medium in accordance with a TDD frame structure; and transmitting the discovery reference signaling during each of the designated subframes, wherein the discovery reference signaling comprises a Primary Synchronization Signal (PSS), a Secondary Synchronization Signal (SSS), a Cell-specific Reference Signal (CRS), a Channel State Information Reference Signal (CSI-RS), a Master Information Block (MIB) signal, and a System Information Block (SIB) signal.

In another example, another communication apparatus is disclosed. The apparatus may include, for example, at least one processor, at least one memory coupled to the at least one processor, and at least one transceiver. The at least one processor and the at least one memory may be configured to designate one or more subframes for transmission of discovery reference signaling over a communication medium in accordance with a TDD frame structure. The at least one transceiver may be configured to transmit the discovery reference signaling during each of the designated subframes, wherein the discovery reference signaling comprises a PSS, an SSS, a CRS, a CSI-RS, a MIB signal, and a SIB signal.

In another example, another communication apparatus is disclosed. The apparatus may include, for example, means for designating one or more subframes for transmission of discovery reference signaling over a communication medium in accordance with a TDD frame structure; and means for transmitting the discovery reference signaling during each of the designated subframes, wherein the discovery reference signaling comprises a PSS, an SSS, a CRS, a CSI-RS, a MIB signal, and a SIB signal.

In another example, another transitory or non-transitory computer-readable medium is disclosed. The computer-readable medium may include, for example, code for designating one or more subframes for transmission of discovery reference signaling over a communication medium in accordance with a TDD frame structure; and code for transmitting the discovery reference signaling during each of the designated subframes, wherein the discovery reference signaling comprises a PSS, an SSS, a CRS, a CSI-RS, a MIB signal, and a SIB signal.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
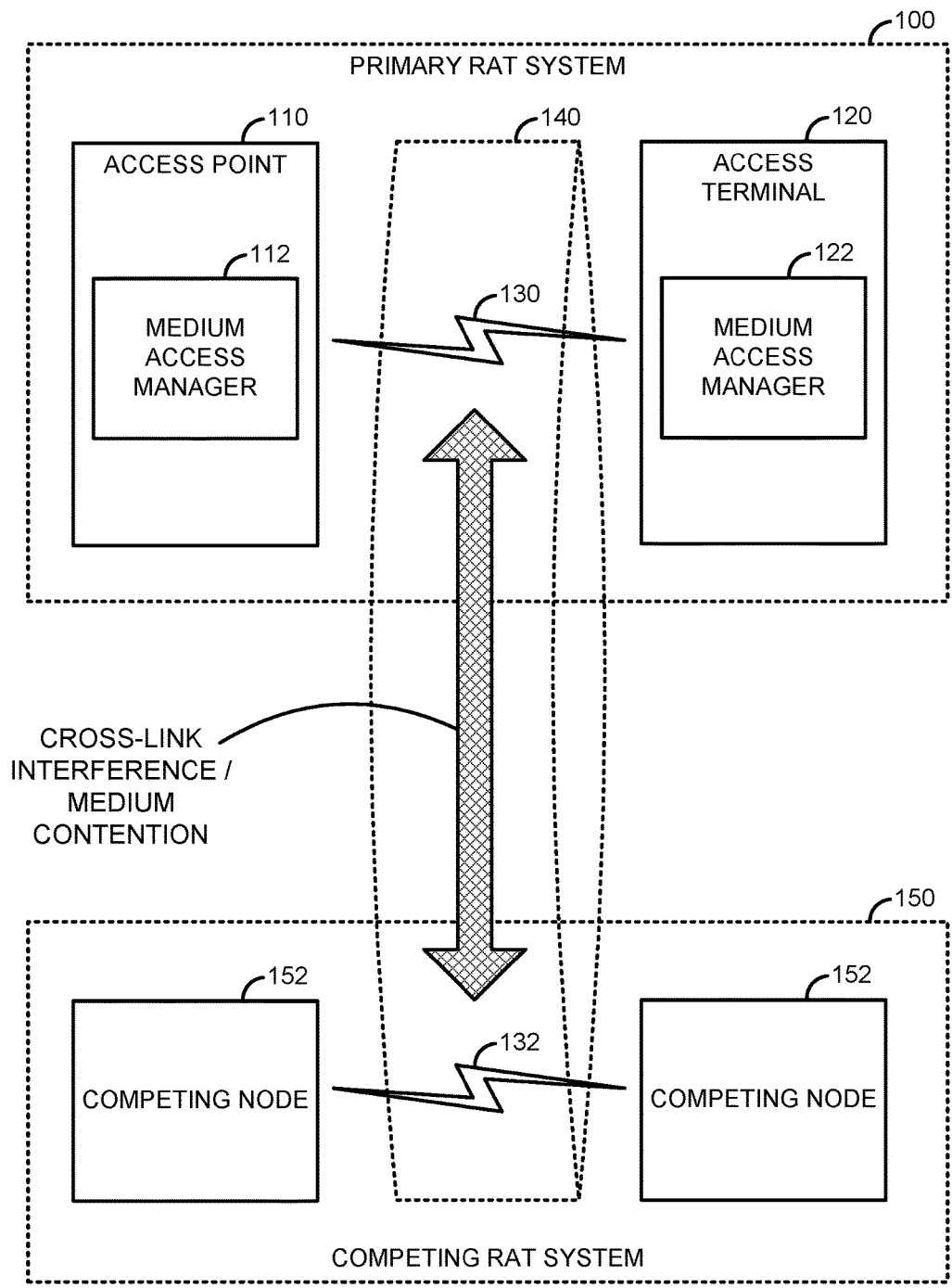
FIG. 1 is a system-level diagram illustrating an example wireless network environment.

The present disclosure relates generally to co-existence techniques between Radio Access Technologies (RATs) operating on a shared communication medium. Various techniques are described in detail below to facilitate aspects such as reference signaling, downlink medium access, uplink medium access, resource reuse, channel structures, acknowledgment schemes, fairness, acquisition, random access, paging, mobility, inter-operator mitigation, and so on for a frame structure implemented on the shared communication medium.

As an example, scheduling grants may be stitched together across transmission opportunities (TXOPs) to make any intervening periods of inaccessibility effectively transparent to the access terminals. For robustness, the scheduling grants may be retransmitted one or several times during each TXOP, such as during each downlink subframe. As another example, subframe resources for carrying an acknowledgment channel over the communication medium may be configured to span a relatively short duration (e.g., one or two symbol periods). This may allow acknowledgment signaling to be condensed into a short but contention-free fraction of a given frame, or to otherwise reduce the amount of contention required for acknowledgment signaling. To compensate for the short duration, the acknowledgment channel may be spread over additional frequency resources. As a still further example, various reference and control signaling may be consolidated into discovery reference signaling sent on one or more designated subframes. The discovery reference signaling may be sent periodically, and, as desired, in accordance with more aggressive contention parameters to provide faster access to the communication medium for at least some instances of the discovery reference signaling.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the contention techniques discussed briefly above. For example, the access point 110 may include a medium access manager 112 and the access terminal 120 may include a medium access manager 122. The medium access manager 112 and/or the medium access manager 122 may be configured in different ways to manage contending for access to the communication medium 140.

Figure 2:
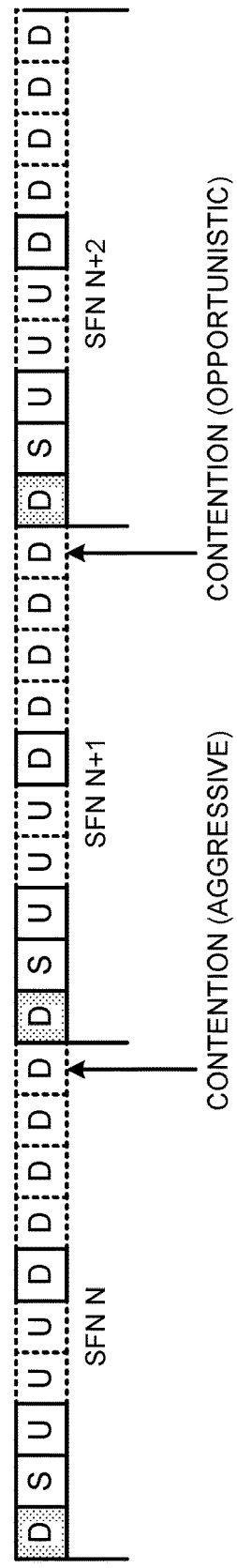
FIG. 2 illustrates an example virtual Time Division Duplexing (TDD) frame structure.

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150.

The illustrated frame structure includes a series of radio frames (RFs) that are numbered in accordance with a System Frame Number (SFN) numerology (SFN N, N+1, N+2, etc.) and divided into respective subframes (SFs), which may also be numbered for reference (e.g., SF0, SF1, etc.). As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes within a radio frame may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

As is further illustrated in FIG. 2, one or more subframes may be designated to include what is referred to herein as Enhanced Discovery Reference Signaling (eDRS). The eDRS may be configured to convey select control signaling for facilitating system operation. The control signaling may include information relevant to timing synchronization, system acquisition, interference measurements (e.g., Radio Resource Measurements (RRM)/Radio Link Measurements (RLM)), tracking loops, gain control (e.g., Automatic Gain Control (AGC)), paging, etc. For example, the eDRS may include a Primary Synchronization Signal (PSS), a Secondary Synchronization Signal (SSS), a Cell-specific Reference Signal (CRS), a Channel State Information Reference Signal (CSI-RS), a Master Information Block (MIB) signal, a System Information Block (SIB) signal, a Paging Channel (PCH) signal, a Random Access Channel (RACH) signal, and various combinations thereof. In LTE, for example, various SF0 signaling (e.g., CRS, SSS, MIB) may be consolidated with other signaling (e.g., PSS, SIB1, SIB2, PCH, RACH, some with lower periodicity) into a common subframe (e.g., SF0) providing all the requisite eDRS information, without, it can be shown, unduly consuming subframe resources.

Figure 3:
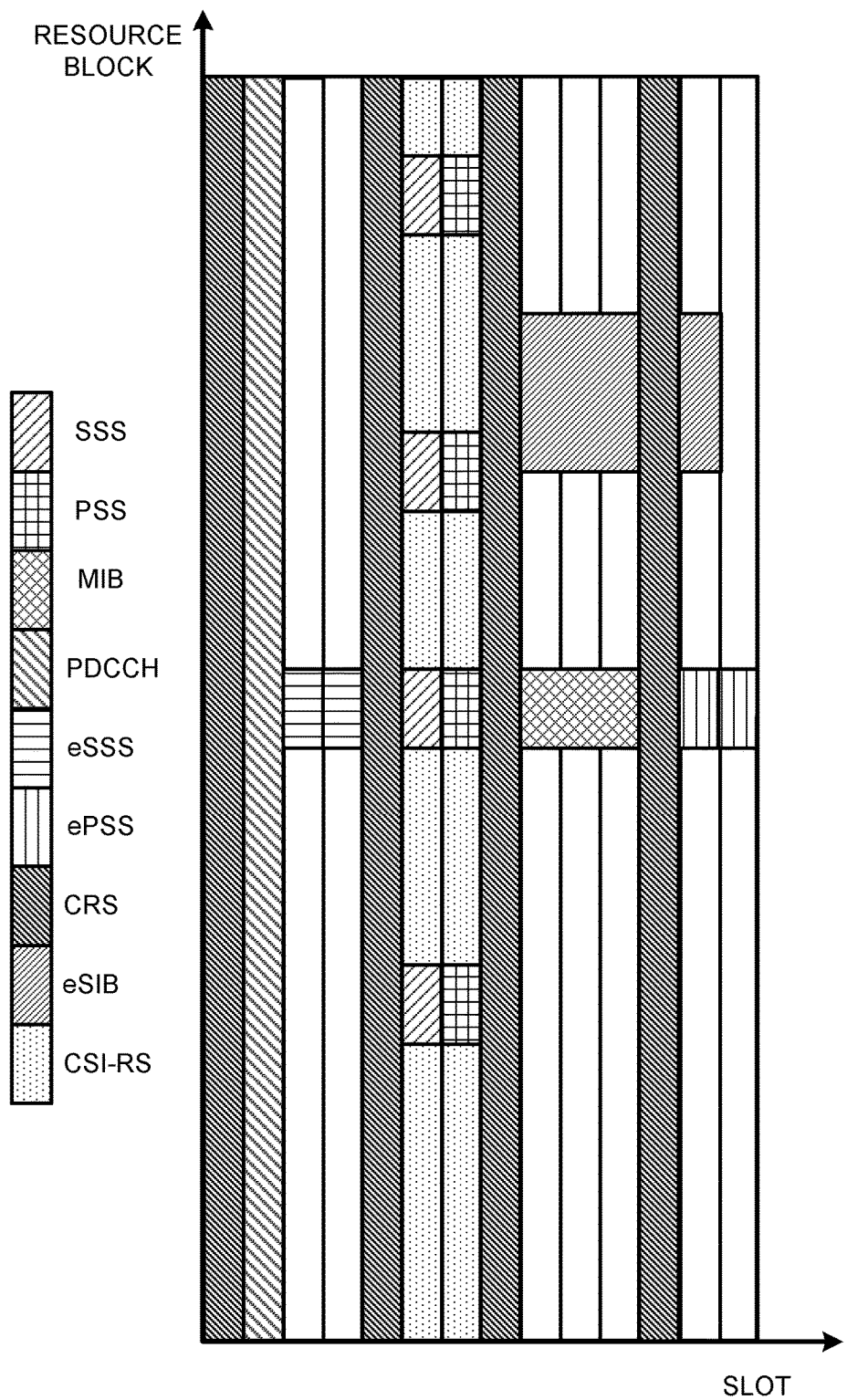
FIG. 3 is a resource block diagram illustrating an example Enhanced Discovery Reference Signaling (eDRS) configuration.

FIG. 3 is a resource block diagram illustrating an example eDRS configuration across slots of a given subframe. In this example, the eDRS includes SSS and an enhanced SSS (eSSS), PSS and an enhanced PSS (ePSS), MIB, Physical Downlink Control Channel (PDCCH), CRS, CSI-RS, and an enhanced SIB (eSIB) signaling.

To facilitate network detection and identification, PSS/SSS may be repeated a few (e.g., 2-4) times across time and/or frequency space. For repetition across time, three new PSS phases may be used, for example, to avoid confusing certain access terminals. While this approach may lack frequency diversity, it may also be more straightforward to implement. For repetition across frequency, existing PSS phases may be reused. This approach may provide better performance due to frequency diversity, but may not be as implementation friendly. Further, to increase the robustness of network detection, the access point 110 may scramble one or more signals with its Public Land Mobile Network Identifier (PLMN ID) or the like. As an example, CRS may be scrambled with the PLMN ID, which provides a wideband and dense signal. As another example, CSI-RS may be scrambled with the PLMN ID, although the resultant signal may be sparser as compared to CRS. As another example, MIB may contain the PLMN ID.

In addition, eDRS signaling may include a traffic indicator to convey downlink traffic information to the access terminal 120 for the purposes of Discontinuous Reception (DRX) scheduling. It may be advantageous for the access terminal 120 to set its DRX timer based on such a traffic indicator rather than counting empty transmission time intervals, which may be empty due to contention or interference on the communication medium 140 rather than a lack of downlink traffic destined for the access terminal 120.

Returning to FIG. 2, as shown, the eDRS may be transmitted periodically (e.g., every 10 ms) in a designated subframe of each radio frame. For example, the eDRS may be transmitted in accordance with a periodicity eDRS_Cycle at each subframe satisfying the condition SFN mod eDRS_Cycle=0 (illustrated by way of example as the first subframe SF0). In some deployments, the access point 110 may transmit the designated eDRS subframe automatically, without contending for access to the communication medium 140. For example, the current ETSI contention rules mandates in Europe allow for a certain fraction of transmissions (e.g., 5%) to proceed without the need for contention even though contention is otherwise generally required. Because the designated eDRS subframe contains substantially important system information, the access point 110 may align its permissible fraction of contention-free transmissions with the designated eDRS subframe.

In other deployments, however, the access point 110 may be required to contend for access to the communication medium 140 to transmit the designated eDRS subframe. In the illustrated example, the access point 110 may begin contention for a designated eDRS subframe in one or more subframes leading up to the designated eDRS subframe, with the immediately prior subframe being shown for illustration purposes. Once the communication medium 140 is seized, the access point 110 may hold it for the designated eDRS subframe by transmitting miscellaneous signaling (e.g., filling messages, reference signals, or preambles), channel reservation signaling (e.g., Clear To Send To Self (CTS2S) messages), and so on.

In some instances, such as for ordinary signaling, the access point 110 may contend for the communication medium 140 using relatively opportunistic contention parameters that may be substantially deferential to the competing RAT system 150. In other instances, however, such as to prioritize access to the communication medium 140 for the designated eDRS subframe, the access point 110 may contend for the communication medium 140 using relatively aggressive contention parameters (e.g., a single-shot CCA, a relatively low backoff threshold, a relatively small contention window, etc.). As an example, whereas the access point 110 may ordinarily defer access to the competing RAT system 150 when signaling energy is detected at a relatively low threshold leading up to the designated eDRS subframe (e.g., −82 dBm per 20 MHz defining a deferential CCA-PD backoff threshold), the access point 110 may instead utilize a higher threshold (e.g., −60 dBm per 20 MHz defining a less deferential CCA-ED backoff threshold). As another example, whereas the access point 110 may ordinarily contend for a relatively long Transmission Opportunity (TXOP) (e.g., one radio frame), which may require a longer contention window, the access point 110 may instead contend for a shorter TXOP (e.g., one subframe sufficient for transmitting the designated eDRS subframe) using a shorter contention window to more quickly secure access to the communication medium 140. Aggressive contention may be performed periodically in accordance with an aggressive contention periodicity, such as every few radio frames (e.g., $T_{AC\text{-}eDRS}$=2-4 radio frames) for those instances that align with the aggressive contention periodicity, with opportunistic contention being performed in the other radio frames.

Figure 4:
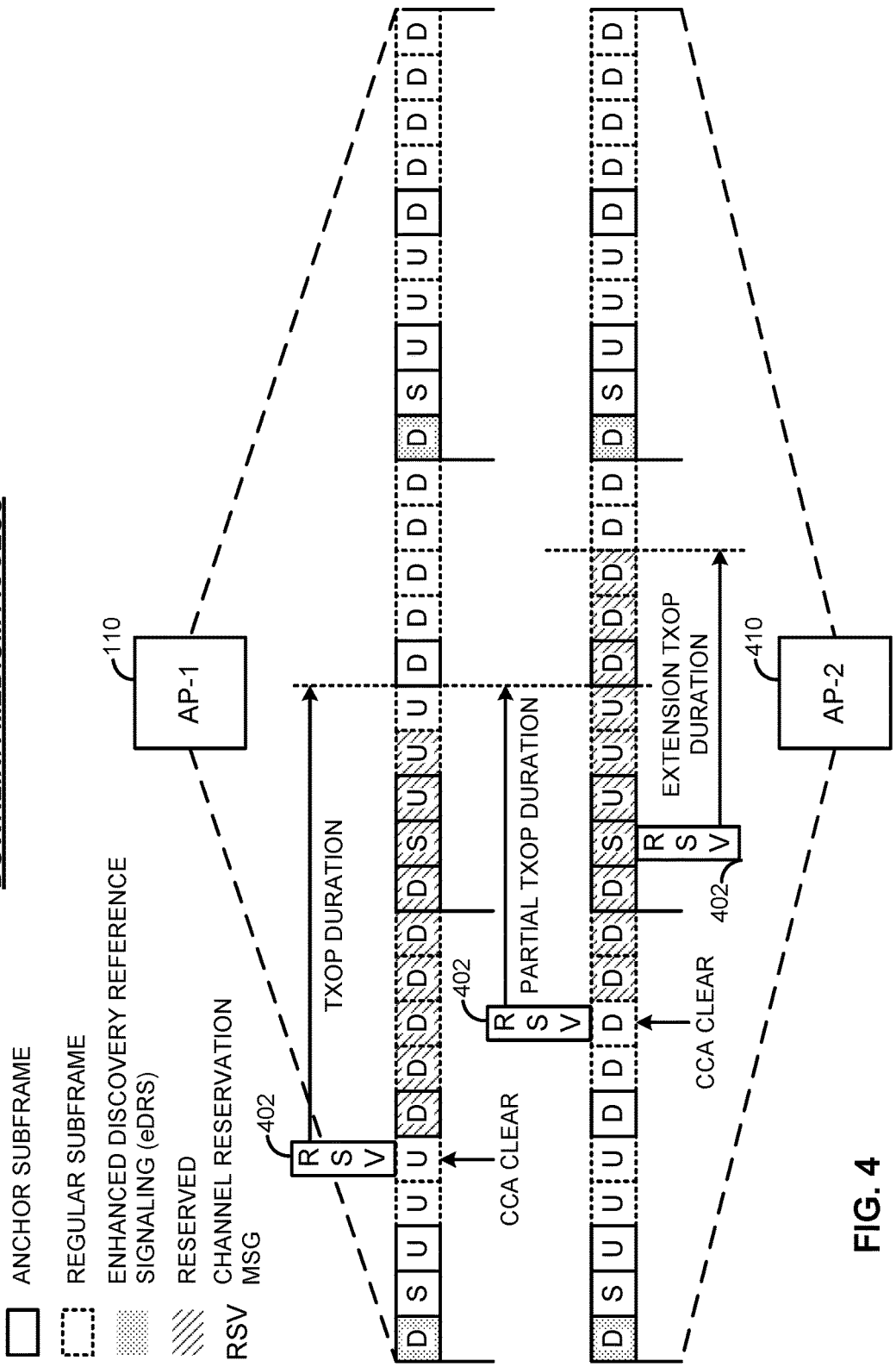
FIG. 4 illustrates an example of downlink medium access.

FIG. 4 illustrates an example of downlink medium access in accordance with the virtual TDD frame structure of FIG. 2. For illustration purposes, the access point 110 is shown as part of a coordinated system that includes another access point 410 operating in accordance with the same frame structure. The access point 110 and the access point 410 may be provided by the same operator, for example.

As shown, at some point during the contention process, the communication medium 140 becomes clear (CCA Clear) and the access point 110 seizes it. In order to reserve the communication medium 140 for itself for a certain period of time (e.g., one radio frame), the access point 110 may send a channel reservation message (RSV) 402 defined for the competing RAT system 150. As an example, the access points 110 and 410 may operate using a frame structure associated with a primary RAT, such as LTE or MulteFire, while the competing RAT 150 may be a WLAN-based RAT requiring shared communication medium 140 reservation. Accordingly, the access point 110 may reserve the shared communication medium 140 in accordance with protocols of the competing RAT 150, but use the reserved resources for operation using frame structures of the primary RAT.

The channel reservation message 402 may be transmitted over the communication medium 140 (e.g., via a competing-RAT-specific transceiver) to reserve the communication medium 140 for primary RAT operation. Example channel reservation messages may include, for example, 802.11a Data packets, Clear-to-Send-to-Self (CTS2S) messages, Request-to-Send (RTS) messages, Clear-to-Send (CTS) messages, Physical Layer Convergence Protocol (PLCP) headers (e.g., a legacy signal (L-SIG), a high throughput signal (HT-SIG), or very high throughput signal (VHT-SIG)), and the like for a competing Wi-Fi RAT, or other similar messages defined for other competing RATs of interest. The channel reservation message 402 may include a duration indication (e.g., a Network Allocation Vector (NAV)) corresponding to the duration of the target TXOP for which the access point 110 contended for access.

In addition, the channel reservation message 402 may include an identifier associated with the primary RAT to alert other devices operating in accordance with the primary RAT (e.g., the access point 410) about the nature of the channel reservation message 402. Example identifiers may include new special-purpose identifiers or preexisting, repurposed identifiers selected to convey primary RAT operation. By utilizing such an identifier in conjunction with the channel reservation message 402, the access point 410 may determine that the communication medium 140 remains available for its own primary RAT communications as well, which may proceed via additional intra-RAT coordination mechanisms built into the primary RAT itself (e.g., code division multiplexing, etc.). In this way, a "mixed-mode" Medium Access Control (MAC) scheme may be employed that takes advantage of the MAC procedures provided by both RATs without one interfering with the other (e.g., without a Wi-Fi MAC procedure causing an LTE MAC procedure to restrict medium access based on what may incorrectly be perceived as Wi-Fi traffic).

Figure 5:
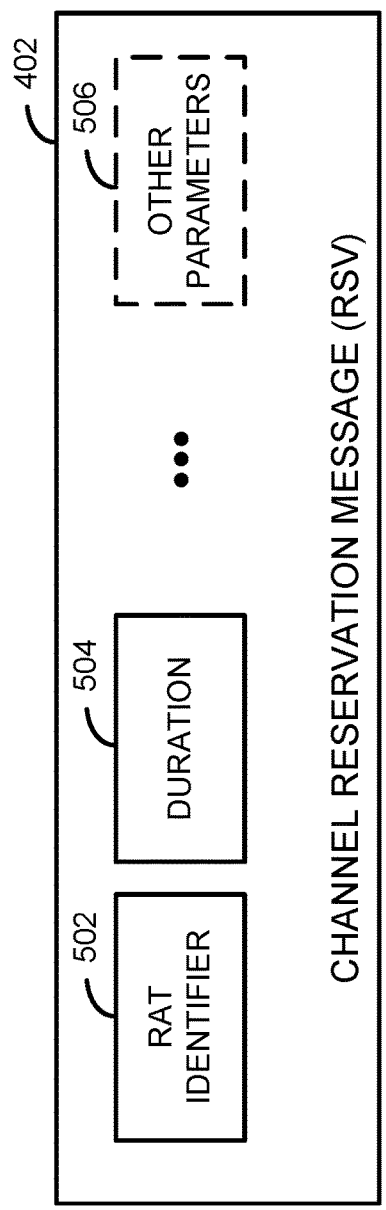
FIG. 5 illustrates an example channel reservation message for inter-RAT coordination.

FIG. 5 illustrates an example channel reservation message for inter-RAT coordination. In this example, the channel reservation message 402 includes a RAT identifier field 502, a duration field 504, and optionally other parameters 506 as required for any given implementation. As discussed above, the duration field 504 may be set to indicate the duration of a given TXOP. The other parameters 506 may include fields related to receiver/transmitter addressing, error correction, etc. For example, the other parameters 506 may include a frame control field, a receiver address field, and a frame check sequence field for a CTS or CTS2S channel reservation message.

The RAT identifier field 502 may be implemented in various ways and in various parts of the channel reservation message 402, including as or part of a header portion (e.g., a MAC header or a PHY header), as or part of a standalone Information Element (IE), and so on. In some designs, the RAT identifier field 502 may be a special-purpose identifier added to the channel reservation message 402 and used exclusively for RAT identification. In other designs, the RAT identifier field 502 may be carved out of a previously unused or reserved set of bits. In still other designs, the RAT identifier field 502 may correspond to a preexisting identifier that is repurposed by way of a predetermined value.

As an example, a particular value of a network identifier such as a Basic Service Set Identifier (BSSID) may be used as the identifier to indicate that the channel reservation message 402 is being transmitted in association with operation of the primary RAT rather than the competing RAT whose signaling protocol is used to transmit the channel reservation message 402. As another example, a particular value of a Receiver Address (RA) may be used as the identifier (e.g., in the RA field of a Wi-Fi CTS frame conventionally used to define the MAC ID of the Network Interface Card (NIC)).

As another example, a particular range of duration values may be used as the identifier. In some designs, the range may be distinguished by a threshold value that would be atypical of competing RAT operation. For example, the typical duration values indicated by Wi-Fi CTS packets are limited by the length of typical Wi-Fi packets (e.g., less than or equal to 5.484 ms, the maximum TXOP length). Accordingly, any detected duration value above a corresponding duration threshold (e.g., greater than 15 ms) may be understood to indicate that the channel reservation message 402 is being transmitted in association with operation of a corresponding RAT other than Wi-Fi.

As another example, a particular value of a scrambler seed in a PHY header may be used as the identifier. The Service field of a Wi-Fi PLCP header, for example, includes scrambler initialization bits originally intended to be used to set the initial state of the descrambler at the receiver that may instead be repurposed to serve as the identifier. As another example, a particular value of a user identifier in a PHY header may be used as the identifier. The Partial Association Identifier (PAID) field of a Wi-Fi PLCP header (defined for VHT packets in the VHT-SIG-A region), for example, originally intended to provide an indication to STAs whether or not the packet is intended for the STA may instead be repurposed to serve as the identifier, at least for competing RAT devices capable of understanding such a header.

In some designs, the channel reservation message 402 may be sent as a one-way communication not invoking any acknowledgement (e.g., CTS2S). In other designs, the channel reservation message 402 may be sent as a two-way handshake communication that is acknowledged by each receiving entity (e.g., CTS/RTS). In addition, the channel reservation message 402 may be sent as a deep handshake signal (e.g., eCTS/eRTS) with a larger coverage area to reach additional, otherwise hidden nodes that may be impacted by primary RAT communication but not able to receive shorter-range channel reservation messages.

Returning to FIG. 4, after the access point 110 seizes the communication medium 140, the access point 410 is later able to seize the communication medium 140 for itself as well. It may be, for example, that signaling from the competing RAT system 150 was received at a higher signaling energy at the access point 410 than at the access point 110, which blocked the access point 410 from accessing the communication medium 140 earlier. At the point at which the communication medium 140 becomes clear (CCA Clear) for the access point 410 (which may recognize the original channel reservation message 402 as corresponding to primary RAT operation and not intended to block additional primary RAT operations), only a fraction of the original TXOP duration of the access point 110 remains (e.g., 7 subframes in the illustrated example). The access point 410 then transmits its own channel reservation message 402.

In some instances, the access point 410 may set the duration of this channel reservation message 402 to the target TXOP (e.g., one radio frame) for which the access point 410 contended for access to the communication medium 140. However, in other instances, including the illustrated example, the access point 410 may instead set the duration of this channel reservation message 402 to a partial value of the target TXOP representing the remainder of the TXOP afforded to the access point 110 (e.g., 7 subframes in the illustrated example). To reserve the remainder of the target TXOP sought by the access point 410 (e.g., 3 subframes in the illustrated example to complete a radio frame), the access point 410 may send an additional "extension" channel reservation message 402 at the next special subframe (e.g., during a guard period free from downlink and uplink traffic associated with the access point 110). This two-message approach may help to address the so-called induced-blind-terminal problem where nodes between the access point 110 and the access point 410 may be prevented (e.g., via interference associated with the access point 110 during its reserved TXOP) from correctly receiving the additional channel reservation message 402 during certain subframes (e.g., downlink or uplink subframes).

One of the advantages of using a channel reservation message that includes a RAT identifier field 502 of the type described above with reference to FIG. 5 is that the access point 110 and the access point 410 (or more generally, any access point associated with the same operator) may more efficiently share resources (so-called resource "reuse"). Whereas the access point 110 may employ a time division of resources with respect to the competing RAT system 150 via the channel reservation message 402, the access point 110 and the access point 410 may share the reserved TXOP as shown in FIG. 4. However, in some scenarios, such as when the access point 110 and the access point 410 are sufficiently nearby one another that their signaling may strongly interfere, it may be advantageous for the access point 110 and the access point 410 to similarly employ a time division of resources.

Figure 6:
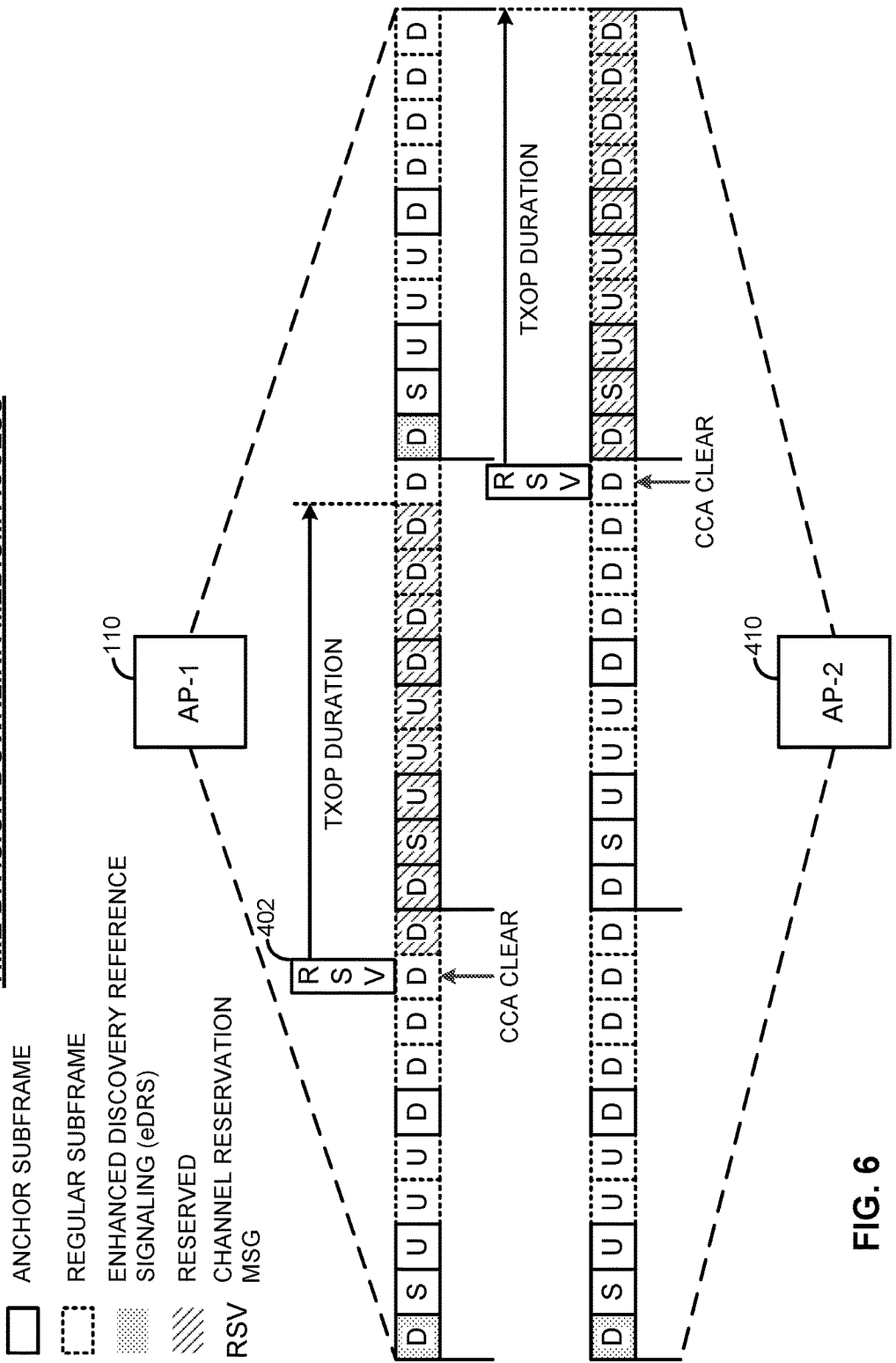
FIG. 6 illustrates another example of downlink medium access.

FIG. 6 illustrates another example of downlink medium access in accordance with the virtual TDD frame structure of FIG. 2. For illustration purposes, the access point 110 is again shown as part of a coordinated system that includes the access point 410 operating in accordance with the same frame structure.

As shown, in this example, downlink medium access is shared in a time division manner between the access point 110 and the access point 410. At some point during the contention process, the communication medium 140 becomes clear (CCA Clear) and the access point 110 seizes it by sending a channel reservation message 402. The channel reservation message 402 may be further configured, in this instance, in such a way as to cause the access point 410 to yield the medium to the access point 110 for the requested TXOP.

Figure 7:
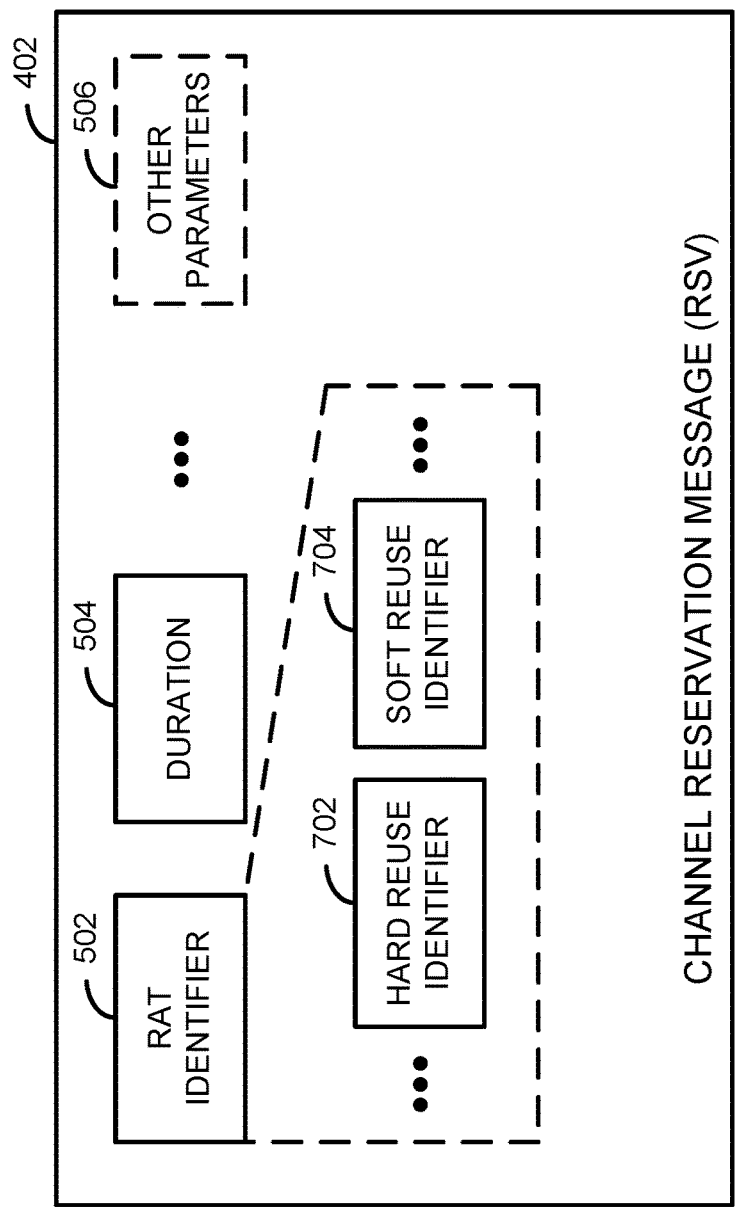
FIG. 7 illustrates an example channel reservation message for further inter-RAT coordination.

FIG. 7 illustrates an example channel reservation message for further inter-RAT coordination. As in the example of FIG. 5, the channel reservation message 402 includes a RAT identifier field 502, a duration field 504, and optionally other parameters 506 as required for any given implementation.

As shown, in this example, the RAT identifier field 502 includes several sub-fields to convey reuse information. As an example, the RAT identifier field 502 may include a hard reuse identifier sub-field 702 that indicates whether intra-operator reuse is acceptable or not for the requested TXOP. As another example, the RAT identifier field 502 may include a soft reuse identifier sub-field 805 that identifies conditions (e.g., a signaling energy threshold) under which intra-operator reuse is acceptable for the requested TXOP.

As discussed in more detail above, the RAT identifier field 502, and by extension, the sub-fields 702 and 704, may be implemented in various ways and in various parts of the channel reservation message 402, including as or part of a header portion (e.g., a MAC header or a PHY header), as or part of a standalone Information Element (IE), and so on.

In some deployments, reservation of a given TXOP by the access point 110 may be sufficient to satisfy contention requirements for not only downlink transmissions from the access point 110 itself, but also uplink transmissions from the access terminal 120 that are scheduled during the TXOP (e.g., during the uplink subframes a radio frame). In other deployments, however, the access terminal 120 may be required to independently contend for access to the communication medium 140 to transmit during any designated uplink subframes.

Figure 8:
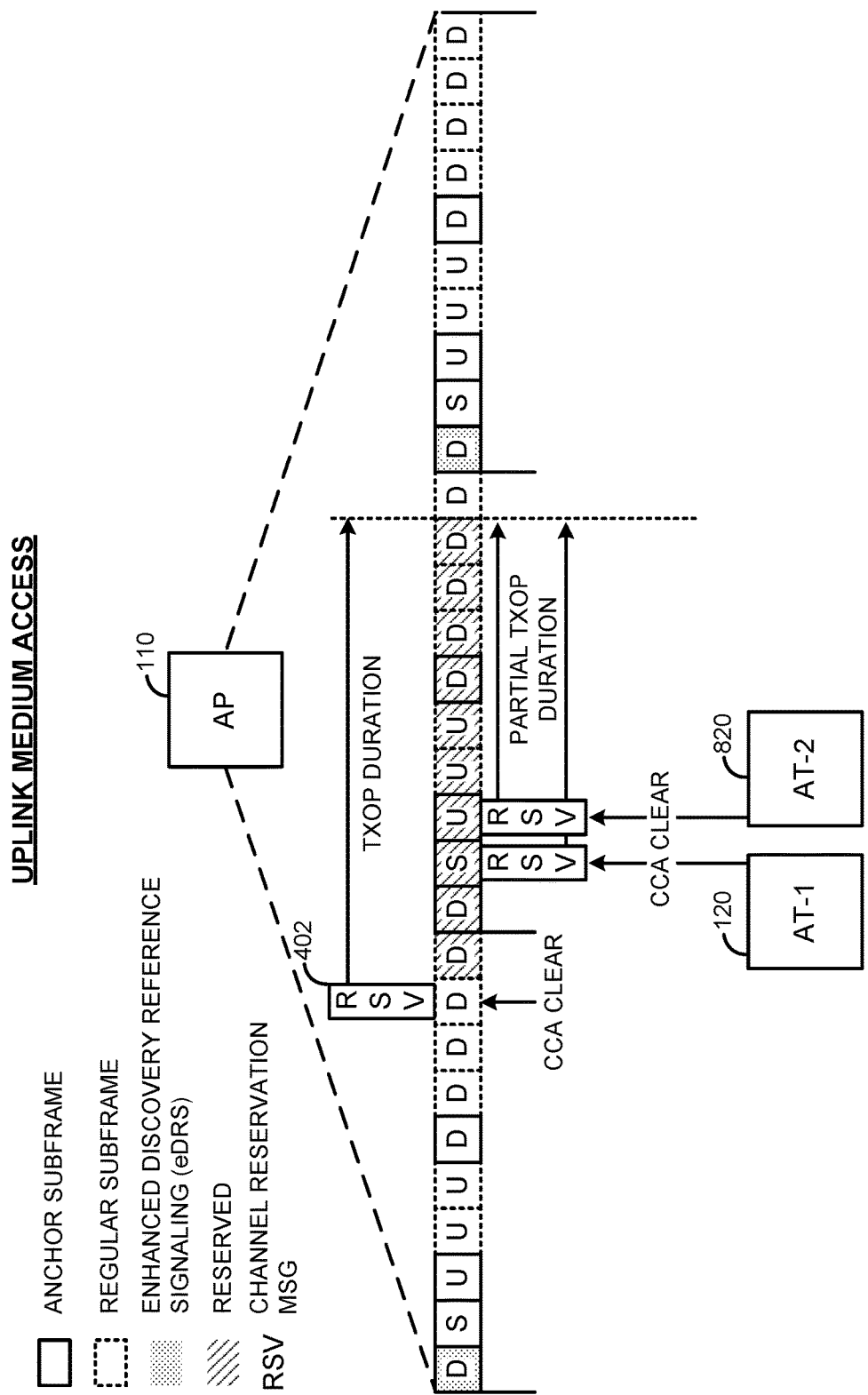
FIG. 8 illustrates an example of uplink medium access.

FIG. 8 illustrates an example of uplink medium access in accordance with the virtual TDD frame structure of FIG. 2. For illustration purposes, the access point 110 is shown as having two associated access terminals, including access terminal 120 (AT-1) and an otherwise similar access terminal 820 (AT-2).

As shown, in this example, the access terminal 120 and the access terminal 820 independently contend for access to the communication medium 140 by transmitting respective channel reservation messages 402 when the communication medium 140 becomes clear (CCA Clear). These channel reservation messages 402 may specify a duration corresponding to the remaining fraction of the original TXOP secured by the access point 110. Further, similar to the contention for eDRS signaling described, the access terminal 120 and access terminal 820 may contend for access to the communication medium 140 using relatively aggressive contention parameters (e.g., a single-shot CCA, a relatively low backoff threshold, a relatively small contention window, etc.).

Signaling for some channels, such as narrowband acknowledgment channels (e.g., PUCCH), may be transmitted without contention even if contention may be required for other signaling subject to regulations.

Whether independent contention is required or not, the access terminal 120 or any other associated access terminal may send a channel reservation message 402 during one or more special subframes (e.g., during a guard period free from downlink and uplink traffic associated with the access point 110) as a further protection.

Figure 9:
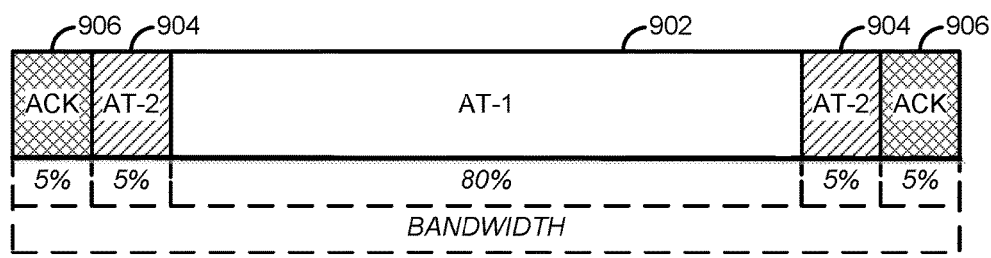
FIG. 9 illustrates an example of an uplink waveform.

FIG. 9 illustrates an example of an uplink waveform that may be used in conjunction with the virtual TDD frame structure of FIG. 2. In some deployments, uplink transmissions may be required to span a minimum fraction of the reserved bandwidth to promote efficient and fair resource allocation. In the illustrated example, the minimum fraction is 80% of the bandwidth (e.g., 16 MHz across a 20 MHz channel), although it will be appreciated that this is for illustration purposes only.

As shown, to accommodate such a wideband distribution, uplink resources may be interleaved across access terminals. In the illustrated example, a first access terminal (e.g., access terminal 120, illustrated as AT-1) may be scheduled in a first portion 902 of the bandwidth that occupies at least the minimum fraction (80% in this example). A second access terminal (e.g., the access terminal 820, illustrated at AT-2) may be scheduled in a second portion 904 of the bandwidth that occupies a smaller fraction of resources (5% in this example) on either side of the first portion 902. While the second portion 904 may not occupy the minimum fraction, it may nevertheless span the minimum fraction in terms of the spreading of its scheduled resources. The remaining edge portions 906 may be used for control signaling such as narrowband acknowledgment channels (e.g., PUCCH), which similarly span the minimum fraction.

It will be appreciated that the two access terminals AT-1 and AT-2 are shown for illustration purposes only, and that additional access terminals may be scheduled and interleaved as desired, subject to bandwidth constraints. Further, although the first access terminal AT-1 is shown as being allocated more resources than the second access terminal AT-2, the respective allocations may be rotated across subframes for proportional fairness.

In some instances, uplink scheduling may span multiple, discontinuous TXOPs. For example, transmission may be interrupted by an intervening period in which the communication medium 140 is occupied by the competing RAT system 150. To avoid rescheduling and retransmission of scheduling grants, the scheduling grants may be configured to carry over from one TXOP to the next. In this way, discontinuous TXOPs may be effectively stitched together over any intervening, inaccessible periods.

Figure 10:
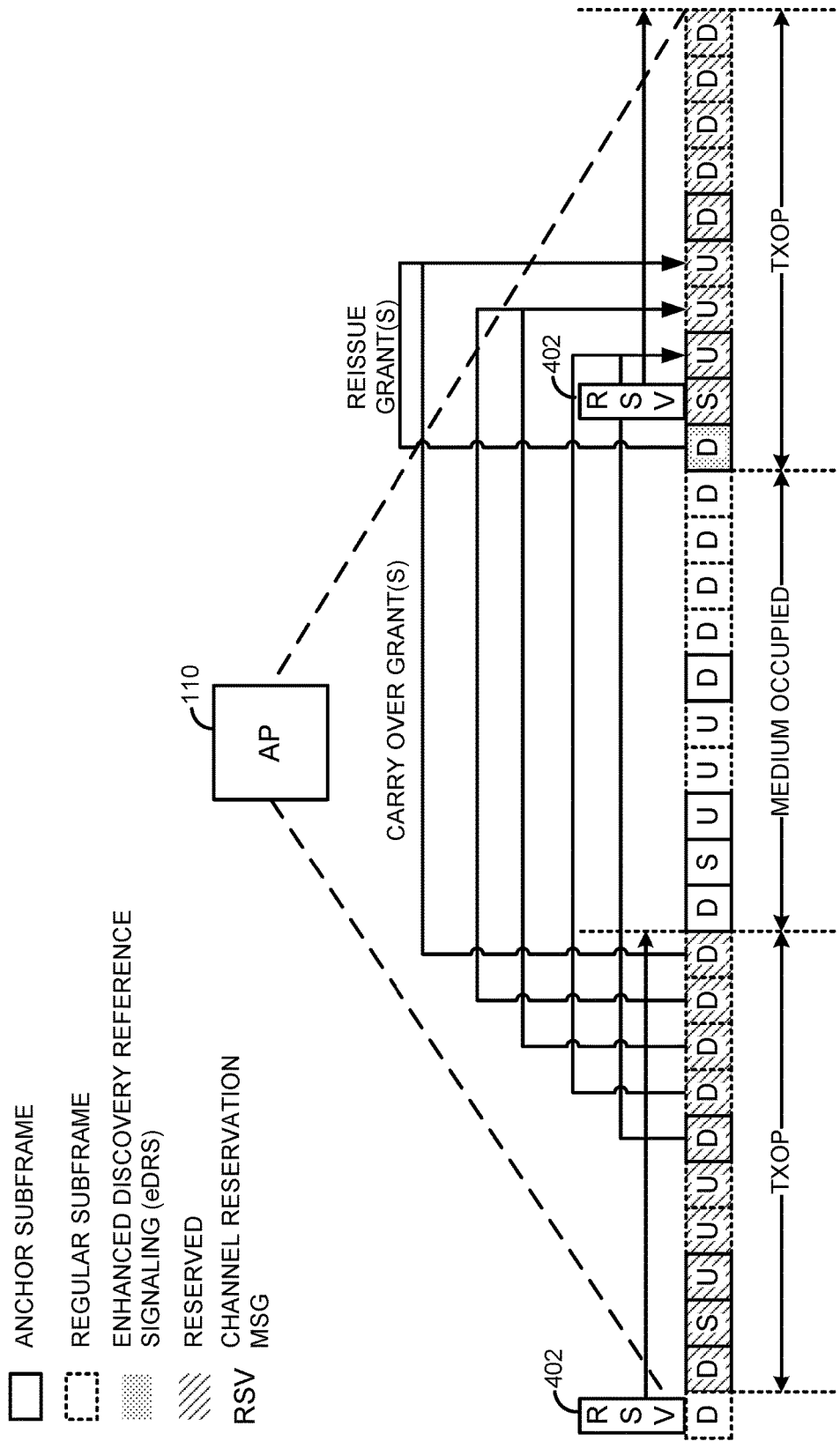
FIG. 10 illustrates an example carry-over uplink grant scheme.

FIG. 10 illustrates an example carry-over uplink grant scheme across TXOPs that may be used in conjunction with the virtual TDD frame structure of FIG. 2. In this example, the access point 110 contends for (and reserves) access to the communication medium 140 for a first TXOP spanning a first duration and a second TXOP spanning a second duration, and yields the communication medium 140 to the competing RAT system 150 during an intervening period in which the communication medium 140 is occupied.

As shown, during one or more downlink subframes of the first TXOP, the access point 110 may transmit a scheduling grant to the access terminal 120 (e.g., broadcast via a common control channel such as PDCCH). Each scheduling grant conveys access to resources on an upcoming uplink subframe. For robustness, more than one such scheduling grant may be sent for each uplink subframe (e.g., reissued/retransmitted in successive downlink subframes, in some cases across TXOPs).

Rather than identify a corresponding uplink subframe in absolute terms (e.g., the next scheduled uplink subframe), the scheduling grant may be configured to convey—and/or the access terminal 120 may be configured to understand—the corresponding uplink subframe in relative terms (e.g., the next uplink subframe during a valid TXOP). For example, the scheduling grant may configure the access terminal 120 to ignore any uplink subframes scheduled for the intervening time period and to carryover the granted uplink resources to an uplink subframe during the second TXOP. Thus, instead of attempting transmission during an uplink subframe in the intervening period in which the communication medium 140 is occupied, the access terminal 120 may attempt transmission at a later time when the communication medium 140 is again accessible, without rescheduling.

In some deployments, acknowledgment messages such as ACK/NACK messages may be exempted from independent contention requirements. This may be due to either the reservation of a given TXOP being sufficient to satisfy contention requirements for both downlink transmissions and uplink transmissions or due to special exemptions for acknowledgment messages themselves. In such a scenario, acknowledgment messages may be exchanged as desired. In other deployments, however, acknowledgment messages may be required to satisfy certain conditions to be exempted from independent contention requirements. For example, as discussed above, the ETSI contention mandates in Europe allow for a certain fraction of transmissions (e.g., 5%) to proceed without the need for contention even though contention is otherwise generally required. In this scenario, acknowledgment signaling may be configured to align with the permissible fraction of contention-free transmissions. In still other deployments, acknowledgment messages may be subjected to independent contention requirements regardless.

Figure 11:
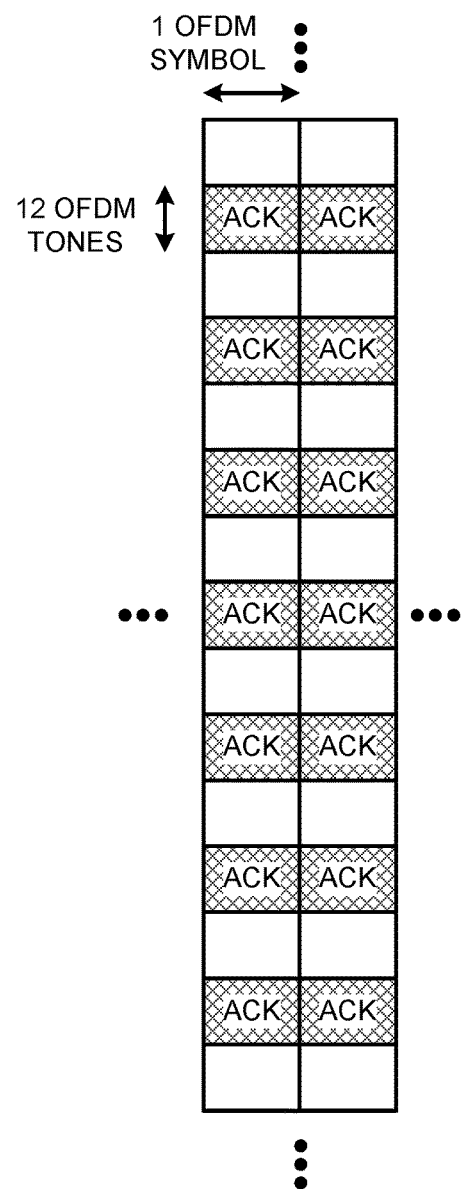
FIG. 11 is a resource map illustrating an acknowledgment channel format.

FIG. 11 is a resource map illustrating an acknowledgment channel format that may be used in conjunction with the virtual TDD frame structure of FIG. 2. In this example, acknowledgment signaling is configured to align with a permissible fraction of contention-free transmissions, but it will be appreciated that the same or a similar reduction in the duration of the acknowledgment channel may be useful more generally for avoiding and/or mitigating the effects of interference on the communication medium 140 from the competing RAT system 150.

As shown, subframe resources for the acknowledgment channel may be condensed in time (e.g., in terms of the number of OFDM symbols) and spread in frequency (e.g., in terms of the number of OFDM tones) so as to occupy no more than a threshold fraction of a given subframe. For example, the threshold fraction of the subframe may comprise two or fewer OFDM symbol periods, while being spread in frequency over one or more interleaved blocks of OFDM tones. As another example, the threshold fraction of the subframe may correspond to a contention-free period of time, such as 5% or less of a duration of a frame defined by the TDD frame structure. In the illustrated example of FIG. 11, the acknowledgment channel is condensed to two OFDM signals and spread across a number of OFDM tones (e.g., in interleaved blocks of 12 OFDM tones), such as to meet a threshold transmission duration associated with a permissible fraction of contention-free transmissions afforded by a given deployment (e.g., 5% in the ETSI example above) or for other reasons.

Figure 12:
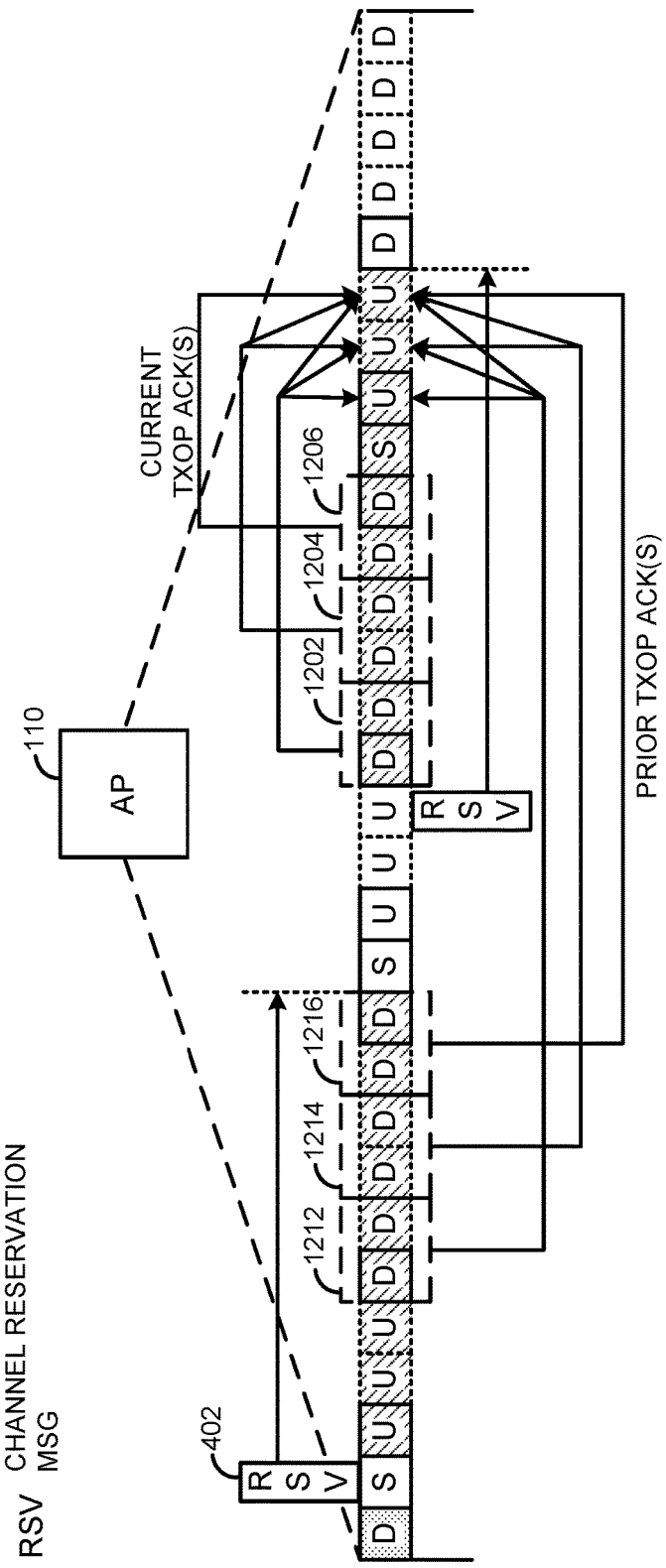
FIG. 12 illustrates a progressive uplink acknowledgment scheme for acknowledging downlink traffic.

FIG. 12 illustrates a progressive uplink acknowledgment scheme for acknowledging downlink traffic that may be used in conjunction with the virtual TDD frame structure of FIG. 2. In this example, acknowledgment signaling is contended for independently.

As shown, in a progressive acknowledgment scheme, successive uplink subframes include not only their own designated acknowledgments, but also the acknowledgments from prior uplink subframes. In this way, acknowledgments can be made more robust against both failure to win contention for the communication medium 140 and interference received over the communication medium 140 from the competing RAT system 150.

In the illustrated example, a first uplink subframe is designated to carry ACK(S)/NACK(s) for a first group of downlink subframes 1202, a second uplink subframe is designated to carry ACK(s)/NACK(s) for a second group of downlink subframes 1204, and a third uplink subframe is designated to carry ACK(s)/NACK(s) for a third group of downlink subframes 1206. It will be appreciated that the number of downlink subframes per group and the particular mapping between downlink subframe groups and uplink subframe acknowledgment locations, for example, is shown for illustration purposes only and may vary across applications.

Under the progressive acknowledgment scheme, the first uplink subframe carries ACK(s)/NACK(s) corresponding to the first group of downlink subframes 1202; the second uplink subframe carries ACK(s)/NACK(s) corresponding to the second group of downlink subframes 1204 as well as ACK(s)/NACK(s) corresponding to the first group of downlink subframes 1202; and the third uplink subframe carries ACK(s)/NACK(s) corresponding to the third group of downlink subframes 1206 as well as ACK(s)/NACK(s) corresponding to the first group of downlink subframes 1202 and ACK(s)/NACK(s) corresponding to the second group of downlink subframes 1204.

As is further shown in FIG. 12, the progressive acknowledgment scheme may also span multiple TXOPs. In the illustrated example, the first uplink subframe carries ACK(s)/NACK(s) corresponding to a fourth group of downlink subframes 1212; the second uplink subframe carries ACK(s)/NACK(s) corresponding to a fifth second group of downlink subframes 1214 as well as ACK(s)/NACK(s) corresponding to the fourth group of downlink subframes 1212; and the third uplink subframe carries ACK(s)/NACK(s) corresponding to a sixth group of downlink subframes 1216 as well as ACK(s)/NACK(s) corresponding to the fourth group of downlink subframes 1212 and ACK(s)/NACK(s) corresponding to the fifth group of downlink subframes 1214. As a more streamlined alternative, the third uplink subframe may alone serve as a group acknowledgment with the first and second subframes omitting any information about the fourth group of downlink subframes 1212 or the fifth group of downlink subframes 1214.

In some designs, intra-TXOP acknowledgment messages (e.g., ACK(s)/NACK(s) corresponding to the first group of downlink subframes 1202, the second group of downlink subframes 1204, and the third group of downlink subframes 1206) and inter-TXOP acknowledgment messages (e.g., ACK(s)/NACK(s) corresponding to the fourth group of downlink subframes 1212, the fifth group of downlink subframes 1214, and the sixth group of downlink subframes 1216) may be combined and carried by the same channel (e.g., PUCCH). In other designs, however, intra-TXOP acknowledgment messages and inter-TXOP acknowledgment messages may be carried by different channels. For example, intra-TXOP acknowledgment messages may be carried by a control channel (e.g., PUCCH) whereas inter-TXOP acknowledgment messages may be carried by a data channel (e.g., PUSCH) for additional capacity and/or diversity.

Various modifications to existing deployments may be effectuated to implement a progressive uplink acknowledgment scheme of the type described above. For example, changes to single-serving-cell requirements may be made to facilitate progressive acknowledgment across component carriers (e.g., in a Carrier Aggregation (CA) scheme). As another example, changes to ACK-bundling requirements may be made to facilitate progressive acknowledgment in a multiplexing fashion, which may be more suitable to acknowledgments that span multiple downlink subframes, for example.

Figure 13:
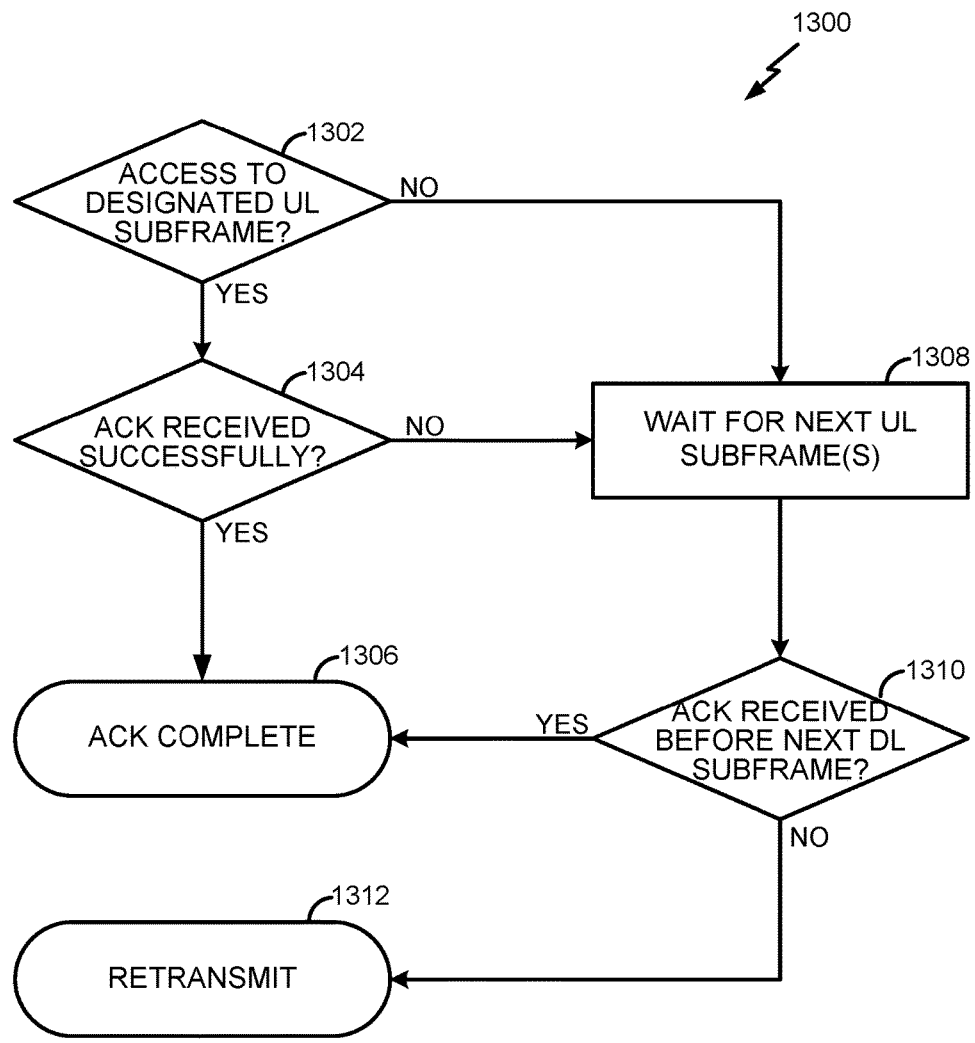
FIG. 13 is a flowchart illustrating a retransmission procedure.

FIG. 13 is a flowchart illustrating a retransmission procedure that may be used in conjunction with the progressive uplink acknowledgment scheme of FIG. 12. Example retransmission procedures include Hybrid Automatic Repeat Request (HARQ) procedures and the like. The procedure 1300 begins after the access point 110 sends a downlink transmission to the access terminal 120 (e.g., on a downlink subframe such as one of the first group of downlink subframes 1202 in FIG. 12), for which acknowledgment is requested or required.

As shown, at the uplink subframe designated for acknowledging the transmission (e.g., the first uplink subframe described above with reference to FIG. 12 for one of the first group of downlink subframes 1202), the access point 110 determines whether an ACK is received or whether the access terminal 120 failed to gain access to the communication medium 140 (decision 1302). Failure to gain access to the communication medium 140 may be determined by using a discontinuous transmission detection procedure or the like, for example. If the access terminal 120 successfully gained access to the communication medium 140 ('yes' at decision 1302), the access point 110 determines whether the ACK has been received successfully (decision 1304). For example, the access point 110 may perform a Cyclic Redundancy Check (CRC) to ensure that it is able to properly decode the ACK. To enhance the robustness of such a determination, a new uplink physical channel may be implemented with additional integrity checks. If the ACK is received successfully ('yes' at decision 1304), the acknowledgment procedure is complete (block 1306).

If the access terminal 120 fails to gain access to the communication medium 140 at the uplink subframe designated for acknowledging the transmission ('no' at decision 1302) or if the ACK is not received successfully ('no' at decision 1304), the access point 110 may wait for the next uplink subframe or subframes (block 1308), if any are forthcoming, to see if the access terminal 120 is able to gain access to the communication medium 140 at a later time where the ACK is to be provided again via progressive acknowledgment. For example, if the access terminal 120 fails to gain access to the communication medium 142 for the first uplink subframe described above with reference to FIG. 12 for acknowledging one of the first group of downlink subframes 1202 or if a message is received but in error, the access point 110 may wait for the second uplink subframe or the third uplink subframe for a progressive acknowledgment ACK.

The access point 110 may wait until the next downlink subframe for the successful reception of an ACK (decision 1310). When an ACK is successfully received before the next downlink subframe, the acknowledgment procedure is complete (block 1306). When no ACK is successfully received before the next downlink subframe, however, the access point 110 may retransmit any packets lacking acknowledgment (block 1312).

Figure 14:
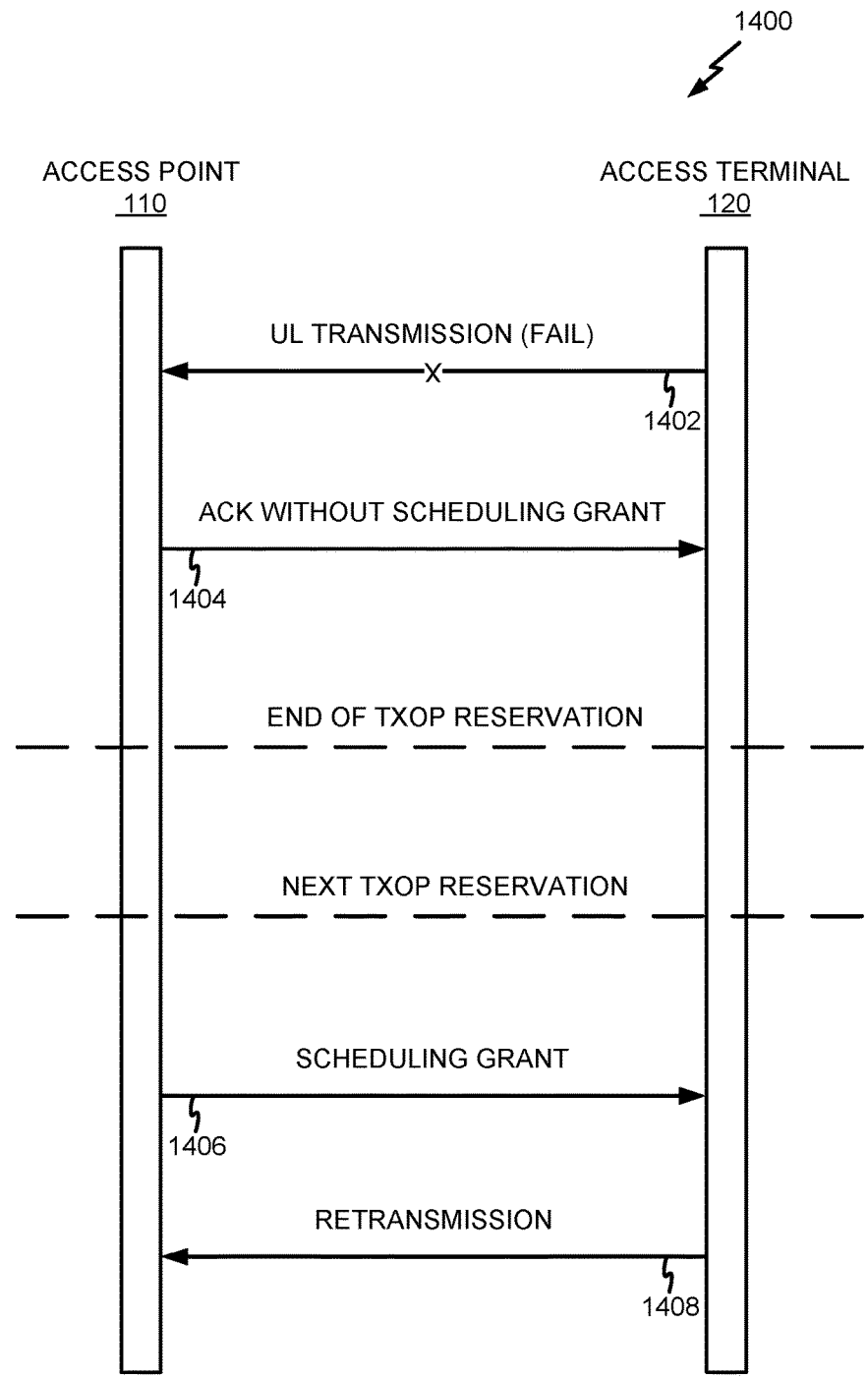
FIG. 14 is a flow diagram illustrating an example downlink acknowledgment scheme for acknowledging uplink traffic.

FIG. 14 is a flow diagram illustrating an example downlink acknowledgment scheme for acknowledging uplink traffic that may be used in conjunction with the virtual TDD frame structure of FIG. 2.

The procedure 1400 begins with the access terminal 120 sending an uplink transmission 1402 to the access point 110, for which acknowledgment is requested or required. In this example, the access terminal 120 is configured for retransmission according to Table 1 below, which utilizes an acknowledgement channel (e.g., Physical Hybrid-ARQ Indicator Channel (PHICH)) in conjunction with a common control channel (e.g., PDCCH) to dictate retransmission behavior.

TABLE 1

Access Terminal UL HARQ Configuration

| ACKNOWLEDGMENT CHANNEL | COMMON CONTROL CHANNEL | ACCESS TERMINAL BEHAVIOR CONFIG |
|---|---|---|
| ACK or NACK | New transmission grant | New transmission |
| ACK or NACK | Retransmission grant | Retransmission (adaptive) |
| ACK | None | No (re)transmission, maintain packet in buffer |
| NACK | None | Retransmission (non-adaptive) |

As shown, the common control channel may provide a scheduling grant for new transmission or a scheduling grant for retransmission. In either case, the access terminal 120 is configured to follow the scheduling grant regardless of the ACK/NACK indication on the acknowledgment channel. In the absence of common control channel information, however, the access terminal 120 follows the ACK/NACK indication of the acknowledgment channel by refraining from retransmitting (in response to an ACK) or retransmitting (in response to a NACK). Nevertheless, even when an ACK is received over the acknowledgment channel, the access terminal 120 may be configured to retain the acknowledged packet in its retransmission buffer pending further instructions.

Accordingly, with reference again to FIG. 14, if the uplink transmission 1402 is not received successfully and a corresponding TXOP reservation is set to expire before retransmission can be completed (as shown), the access point may send to the access terminal 120 a positive acknowledgment (ACK) on the acknowledgment channel and no scheduling grant on the common control channel (signaling 1404). Whereas other combinations of acknowledgment channel and common control channel indicators may cause the access terminal to either discard the packet without retransmitting or to retransmit at an uplink subframe that is not reserved for primary RAT transmission, sending an ACK on the acknowledgment channel and no scheduling grant on the common control channel causes the access terminal 120 to retain the packet and await further instructions. At a later point when the communication medium 140 is recaptured and a new TXOP reservation is in effect, the access point 110 may send to the access terminal 120 the appropriate scheduling grant for retransmitting the packet (signaling 1406) and the access terminal 120 may retransmit the packet accordingly (signaling 1408).

Figure 15:
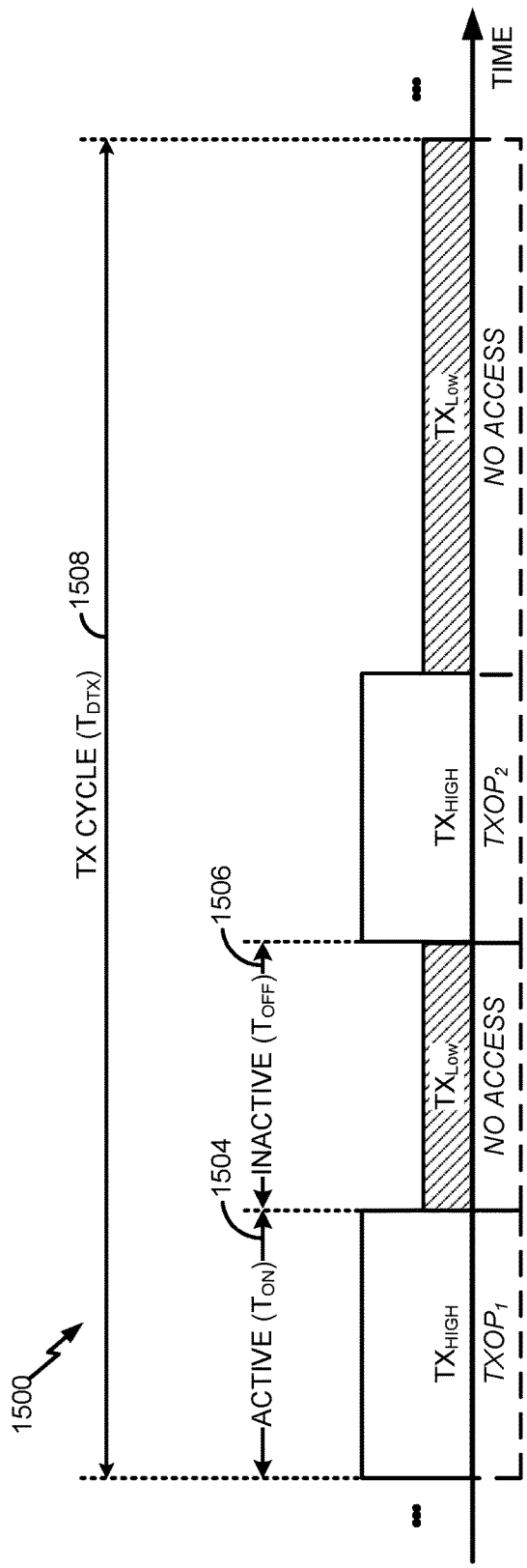
FIG. 15 illustrates certain aspects of an example Discontinuous Transmission (DTX) communication scheme.

FIG. 15 illustrates certain aspects of an example Discontinuous Transmission (DTX) communication scheme that may be implemented on the communication medium 140. The DTX communication scheme may be used to foster fairness in co-existence between (i) primary RAT communications between the access point 110 and access terminal 120 and (ii) other, competing RAT communications associated with the competing RAT system 150. Whereas the access point 110, for example, may seize the communication medium 140 for primary RAT communications using relatively aggressive contention parameters and other techniques, as described above, it may confine its primary RAT communications over the communication medium 140 to a series of active periods 1504 and yield the communication medium 140 to the competing RAT system 150 during other, inactive periods 1506 of communication. The relationship between the active periods 1504 and the inactive periods 1506 may be adapted in different ways to help ensure fairness.

In general, the switching between active periods 1504 and inactive periods 1506 may be conditional based on the contention procedures described in more detail above. In the illustrated example, the communication medium 140 is seized for primary RAT operation during a first TXOP (TXOP$_1$) (e.g., one radio frame) and again later during a second TXOP (TXOP$_2$), corresponding to respective active periods 1504, with interspersed periods of no access, corresponding to respective inactive periods 1506. A given time period may be designated as a DTX cycle 1508 having a length T$_{DTX}$ and encompassing one or more of the active periods 1504 and one or more of the inactive periods 1506. A set of one or more DTX cycles 1508 may collectively form a DTX communication pattern 1500.

During a period of time T$_{ON}$ associated with each active period 1504, primary RAT transmission on the communication medium 140 may proceed at a normal, relatively high transmission power (TX$_{HIGH}$). During a period of time T$_{OFF}$ associated with each inactive period 1506, however, primary RAT transmission on the communication medium 140 is disabled or at least sufficiently reduced to a relatively low transmission power (TX$_{LOW}$) in order to yield the communication medium 140 to the competing RAT system 150. During this time, however, various network listening functions and associated measurements may be performed, such as medium utilization measurements, medium utilization sensing, and so on.

The DTX communication scheme may be characterized by a set of one or more DTX parameters. Each of the associated DTX parameters, including, for example, a period (i.e., the length of T$_{CYCLE}$), a duty cycle (i.e., $\Sigma$T$_{ON}$/T$_{DTX}$) and the respective transmission powers during active periods 1504 and inactive periods 1506 (TX$_{HIGH}$ and TX$_{LOW}$, respectively), may be adapted based on the current signaling conditions on the communication medium 140 to dynamically optimize the DTX communication scheme. For example, a secondary RAT transceiver of the access point 110 configured to operate in accordance with the RAT of the competing RAT system 150 may be further configured to monitor the communication medium 140 during the time period T$_{OFF}$ for competing RAT signaling that may compete with primary RAT communication for access to the communication medium 140. The access point 110 may determine a utilization metric associated with utilization of the communication medium 140 by the competing RAT system 150. Based on the utilization metric, the associated parameters may be set and a primary RAT transceiver of the access point 110 may be configured to restrict its contention for access to the communication medium 140 based thereon (e.g., cease contending for access to the communication medium 140 in a given DTX cycle 1508 once its duty cycle allocation has been exhausted).

As an example, if the utilization metric is high (e.g., above a threshold), one or more of the parameters may be adjusted such that usage of the communication medium 140 by the primary RAT is reduced (e.g., via a decrease in the duty cycle or transmission power). Conversely, if the utilization metric is low (e.g., below a threshold), one or more of the parameters may be adjusted such that usage of the communication medium 140 by the primary RAT is increased (e.g., via an increase in the duty cycle or transmission power).

Returning to FIG. 2, it may be advantageous to increase the robustness of certain synchronization signaling over the communication medium 140 to help ensure that system acquisition is achieved in a timely and efficient manner. For example, synchronization signaling such as PSS/SSS may be repeated more densely, in frequency and/or time (e.g., 2-4 occurrences over a 20 ms window), to facilitate single-shot detection. Whereas a more spread out synchronization signaling scheme may provide better latency performance, it may desirable to prioritize robustness in a contention-based environment such as the communication medium 140 that may experience erasures due to interference. FIG. 3 illustrates an example eDRS configuration in which PSS/SSS is repeated four times. As another example, synchronization signaling such as PSS/SSS may be power boosted to improve detectability. As another example, synchronization signaling such as PSS/SSS may be protected by channel reservation messaging (e.g., CTS2S by the access point 110 and/or the access terminal 120).

Figure 16:
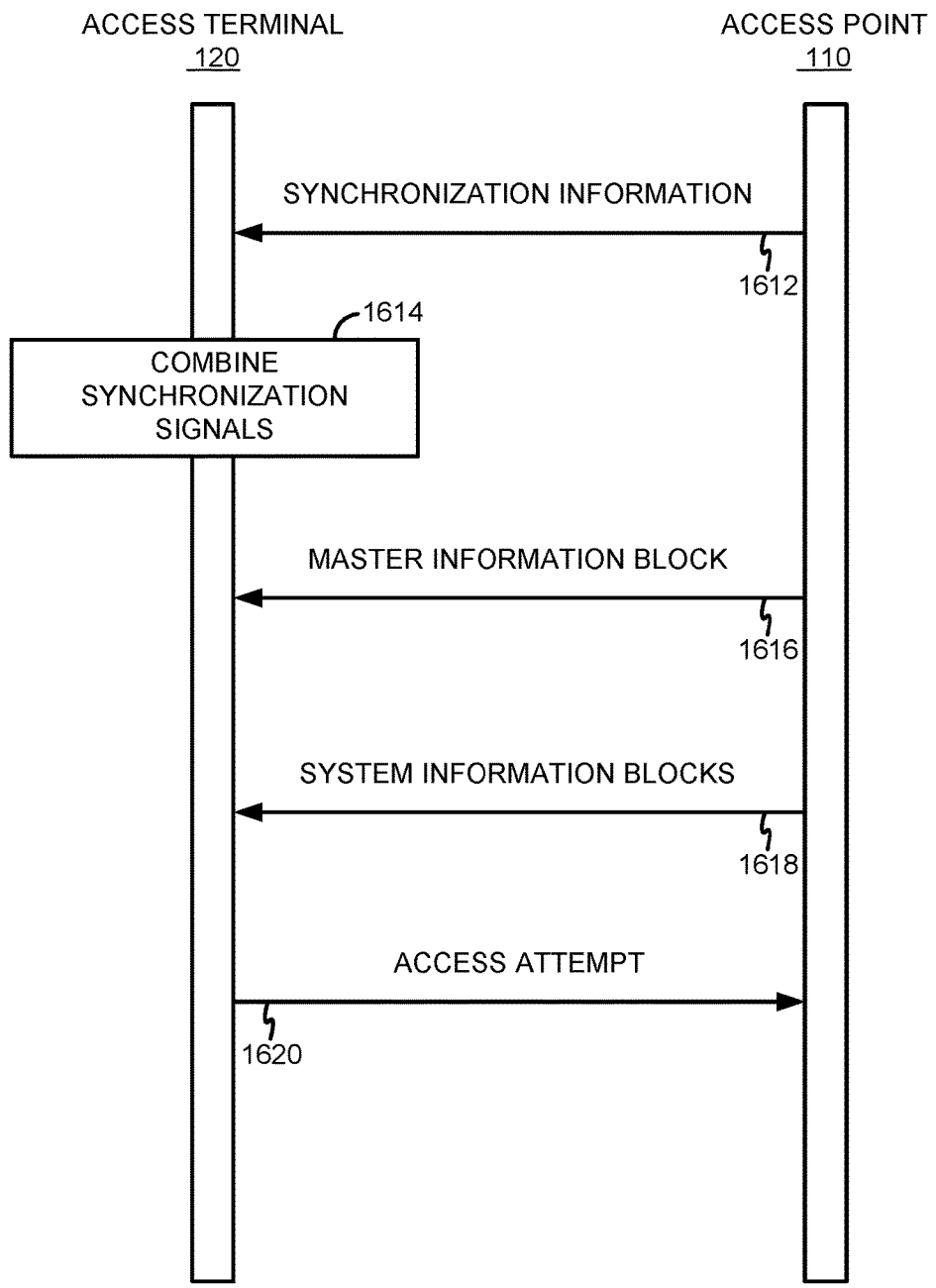
FIG. 16 is a signaling flow diagram illustrating a system acquisition procedure.

FIG. 16 is a signaling flow diagram illustrating a system acquisition procedure that may be used in conjunction with the virtual TDD frame structure of FIG. 2. In this example, the access point 110 is providing service over the communication medium 140 in accordance with the virtual TDD frame structure of FIG. 2 and the access terminal 120 is performing system acquisition.

As shown, the access terminal 120 initially receives system synchronization information (e.g., PSS/SSS signaling) (signal 1612). With reference to FIGS. 3 and 4, synchronization signaling such as PSS/SSS may be received repeatedly and combined over frequency and/or time to reconstruct the PSS/SSS signaling as necessary (block 1614). From this, the access terminal 120 acquires the Physical Cell Identifier (PCI), time slot, and frame synchronization of the access point 110, which enables the access terminal 120 to locate and decode other information.

In particular, the access terminal 120 is able to decode the MIB broadcasted by the access point 110 (signal 1616). As discussed above, the MIB may be used to distinguish the operator identity (e.g., PLMN ID) associated with the access point 110, which may vary in a shared operating environment such as the communication medium 140. As another example, the operator identity may be scrambled with CRS/CSI-RS. Based on the decoded information, the access terminal 120 may decode other system information blocks, such as SIB-1, SIB-2, and so on (signal 1618). Decoding of SIB-1 and SIB-2 allows the access terminal 120 to begin accessing the system (e.g., via a Random Access Channel (RACH)) (signal 1620). A new condensed SIB format, referred to above with respect to FIG. 3 as eSIB, may also be used.

Figure 17:
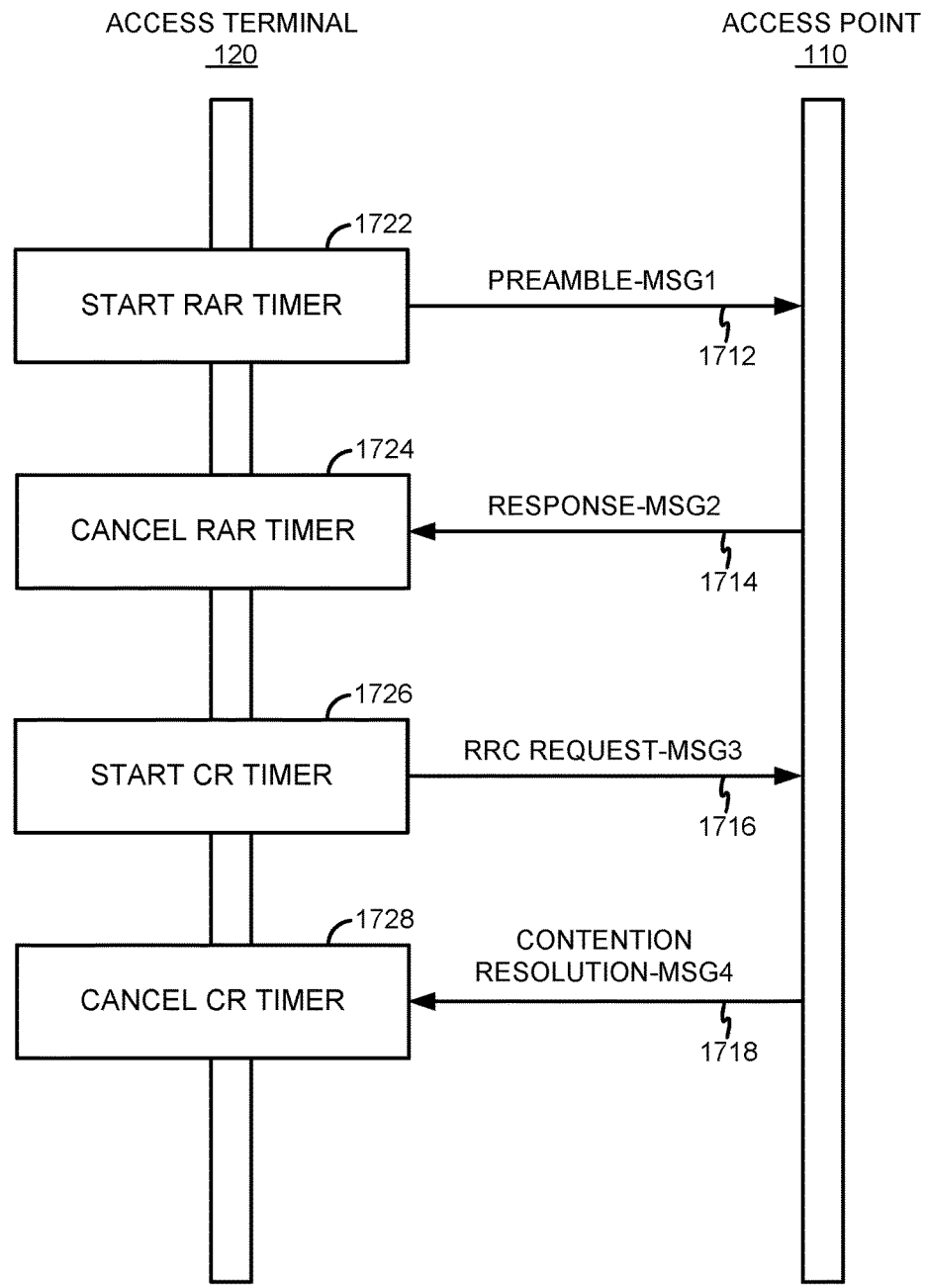
FIG. 17 is a signaling flow diagram illustrating an example random access procedure.

FIG. 17 is a signaling flow diagram illustrating an example random access procedure that may be adapted for use with the virtual TDD frame structure of FIG. 2. In this example, the access point 110 is providing service over the communication medium 140 in accordance with the virtual TDD frame structure of FIG. 2 and the access terminal 120 is performing a contention-based random access procedure over a Physical Random Access Channel (PRACH) to gain access to uplink resources.

Contention-based random access may be performed as a generally four-part procedure. Initially, the access terminal 120 transmits a random access preamble (Msg1 1712), the format and PRACH time domain resource allocation of which may be indicated by a PRACH-ConfigurationIndex parameter. In conjunction with transmitting Msg1, the access terminal 120 sets a Random Access Response (RAR) timer (e.g., in accordance with a ra-ResponseWindowSize parameter) (block 1722) and waits for an RAR message (Msg2 1714) on a common control channel (e.g., PDCCH). Upon receiving Msg2 before the RAR timer expires, the access terminal 120 cancels the RAR timer (block 1724). Otherwise, the access terminal 120 retransmits Msg1 1712.

In Msg2, the access terminal 120 receives the timing alignment value, resources (uplink grant), and temporary identifier (e.g., Cell Radio Network Temporary Identifier (C-RNTI)) to be utilized in transmitting an RRC request (Msg3 1716). In conjunction with transmitting Msg3, the access terminal 120 sets a Contention Resolution (CR) timer (e.g., in accordance with a mac-ContentionResolutionTimer parameter) (block 1726).

After transmission of Msg3, the access terminal 120 monitors the common control channel for a CR message containing its temporary identifier (Msg4 1718) until expiration of the CR timer. In conjunction with successfully decoding Msg4, the access terminal 120 cancels the CR timer (block 1728).

In order to ensure that random access is coordinated with the virtual TDD frame structure of FIG. 2, one or more of the random access parameters may be specially configured to constrain PRACH (time) resources and access point responses to only fall in the radio frame preceding an aggressive-contention eDRS. For example, the access point may configure PRACH resources to only fall in the first half of odd frames (e.g., via the prach-ConfigurationIndex satisfying T0=2 (odd frames only) and T1=0 (located in the first half frame)), configure the RAR window to cover the next eDRS subframe in case access to the communication medium 140 is not won before that for the downlink (e.g., via the ra-ResponseWindowSize), configure the contention resolution window to cover multiple eDRS subframes (e.g., via the mac-ContentionResolutionTimer), and so on.

Figure 18:
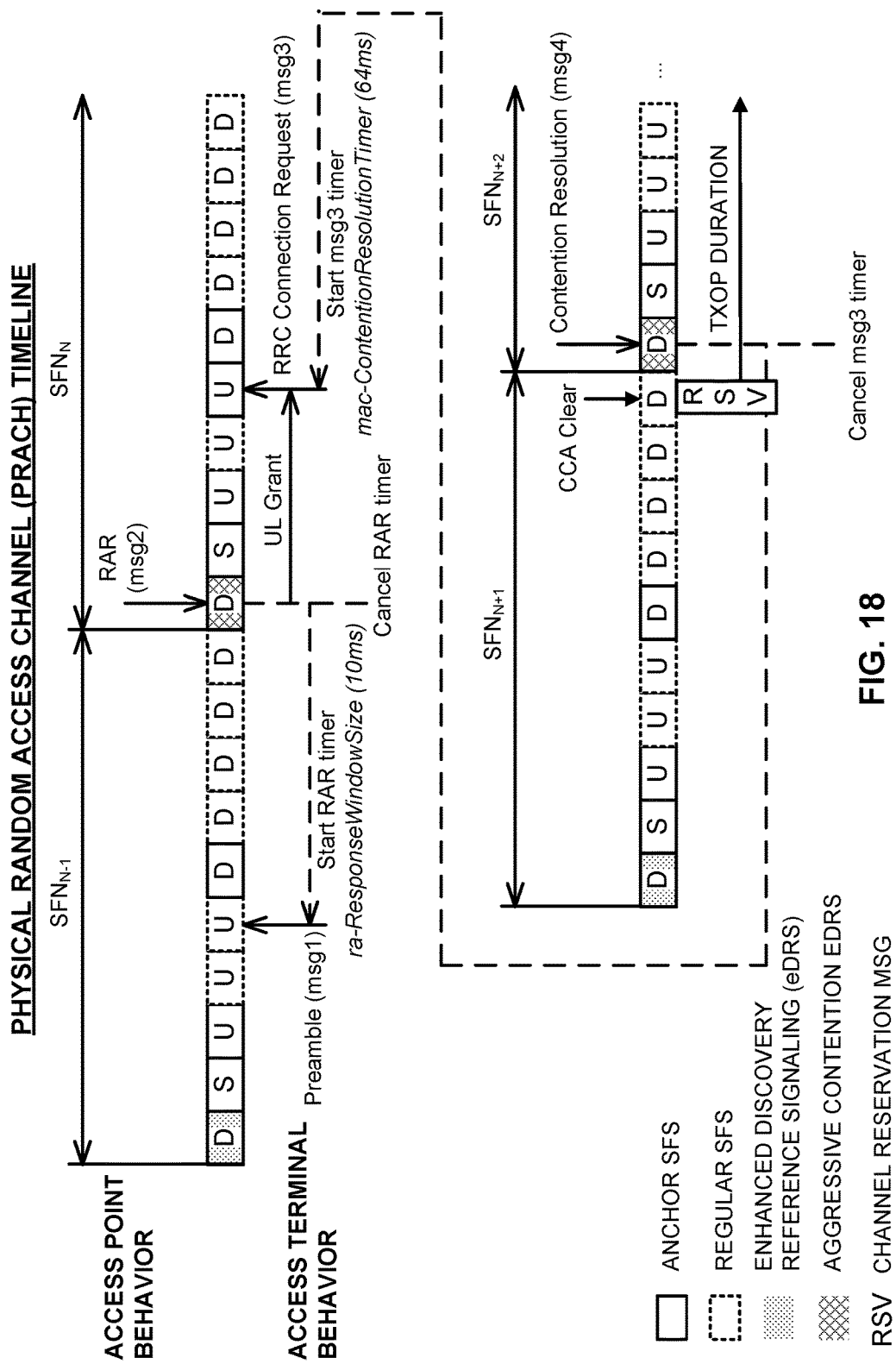
FIG. 18 is a timing diagram illustrating an example random access procedure.

FIG. 18 is a timing diagram illustrating an example adaptation of the random access procedure of FIG. 17 for operation with the virtual TDD frame structure of FIG. 2. In this example, the aggressive-contention eDRS periodicity is set to $T_{AC\text{-}eDRS}=2$ radio frames, the prach-ConfigurationIndex=1 (i.e., corresponding to a (0, 2, 0, 1) configuration that specifies odd radio frames, the first half frame, and the second uplink subframe), the RAR window parameter ra-ResponseWindowSize=10 ms, and the Msg3 contention window parameter mac-ContentionResolutionTimer=64 ms.

As shown, the timing diagram of FIG. 18 covers two cycles of aggressive-contention eDRS, including four radio frames numbered $SFN_{N-1}$ through $SFN_{N+2}$. In order to ensure that the RAR Msg2 is delivered in $SFN_N$ (an aggressive-contention eDRS radio frame), the access terminal 120 sends its preamble Msg1 in the preceding $SFN_{N-1}$, during the uplink subframe specified by the prach-ConfigurationIndex. Because the RAR window parameter ra-ResponseWindowSize is set to a relatively long value (10 ms being an illustrative example), the RAR Msg2 delivered in the first subframe of $SFN_N$ (an aggressive-contention eDRS radio frame) is guaranteed to be within the RAR window.

As discussed in more detail above with reference to FIG. 17, upon receiving the RAR Msg2 specifying an uplink grant, the access terminal 120 may send the RRC Msg3 (e.g., later in $SFN_N$) and set its CR timer. Because the CR timer parameter mac-ContentionResolutionTimer is set to a relatively long value (64 ms being an illustrative example), the access terminal 120 may wait for another aggressive-contention eDRS radio frame at $SFN_{N+2}$ to receive the CR Msg4 without the CR timer expiring due to the delay introduced by SFN$_{N+1}$ (an opportunistic-contention eDRS radio frame for which contention may be lost to the competing RAT system 150).

In some designs, various random access procedure messages may be further protected by a channel reservation message. For example, the access terminal 120 may send a channel reservation message before the random access preamble (Msg1) for additional protection (in particular, if the random access preamble (Msg1) is being resent). Similarly, the access terminal 120 may also send a channel reservation message before the RAR message (Msg2) for additional protection. The access point 110 may send a channel reservation message before the RAR message (Msg2) when it detects the random access preamble (Msg1). The access point 110 (or the access terminal 120) may also attempt to reserve the communication medium 140 for the RRC request (Msg3) (e.g., via a common or separate channel reservation message as for the RAR message (Msg2)). Channel reservation messaging may also be used to protect RRC request (Msg3) granted slots, RRC request (Msg3) P-HICH, and the contention resolution message (Msg4). In some cases (such as inbound mobility signaled over the network), the access point 110 may also be able to protect the random access preamble (Msg1) via a channel reservation message.

In some designs, various random access procedure messages may be sent on a different component carrier (PCell or SCell) of the access point 110 than the one for which access is being requested. The component carrier configuration of the access point 110 may be broadcast or sent as part of an RRC handover command, for example. As an example, the access terminal 120 may send the random access preamble (Msg1) on whichever component carrier of the access point 110 is free at the desired time. The access point 110 may also send the RAR message (Msg2) on each component carrier of the access point 110. In addition, the uplink grant specified by the RRC request (Msg3) may be designated to apply to each of the component carriers. HARQ process feedback retransmit grants may also be designated to apply to each of the component carriers of the access point 110.

The access terminal 120 may compete with another access terminal during the RACH procedure; it is possible that access terminal 120 receives the contention completion message (Msg4), but that the other access terminal does not (e.g., due to interference from the competing RAT system 150). To address this case, the access point 110 may choose to protect the (potential, since the access point 110 is not aware of it) other access terminal by avoiding a grant of the contention resolution uplink resources until the end of the contention; this can be done by suspending the retransmission process for the RRC request (Msg3).

Figure 19:
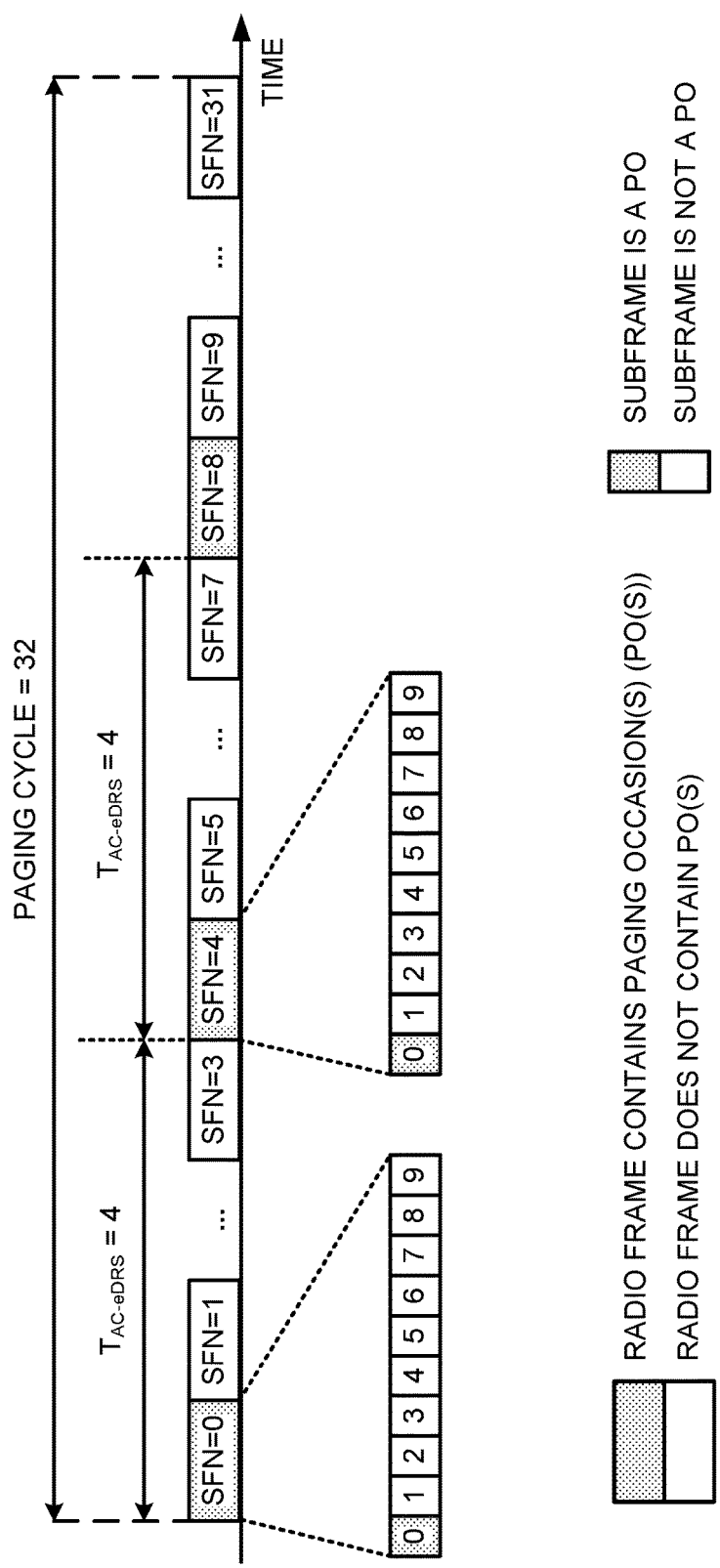
FIG. 19 is a timing diagram illustrating an example paging structure.

FIG. 19 is a timing diagram illustrating an example paging structure adapted for use with the virtual TDD frame structure of FIG. 2. In this example, the aggressive-contention eDRS periodicity is set to 4 radio frames (i.e., $T_{AC-eDRS}=4$) and the paging cycle is set to 32 radio frames for illustration purposes.

A Paging Frame (PF) is a radio frame that may contain one or multiple Paging Occasion (PO) subframes for sending a paging message used for paging and system information change notification. In LTE, for example, the location of a PF for the access terminal 120 (an LTE UE, in this example) is defined by certain paging parameters according to the following equation:

$$\text{SFN mod } T = (T/N)*(\text{UE\_ID mod } N) \quad \text{(Eq. 1)}$$

Here, T=min(UE specific DRX value, DefaultPagingCycle) and represents the minimum DRX cycle as between the UE-specific DRX cycle and the default, cell-specific DRX cycle. Meanwhile, N=min(T, nB) and represents the number of paging frames in a paging cycle of the UE, where nB={2T, T, T/2, T/4, T/8, T/16, T/32}. Finally, UE_ID=International Mobile Subscriber Identity (IMSI) mod 1024 and is used as a pseudorandom spacing value. The DefaultPagingCycle and nB parameters are broadcast in system information (SIB-2).

Continuing with the LTE example above, the location of a PO with a PF for the access terminal 120 (again, an LTE UE, in this example) is defined by other paging parameters according to the following equation:

$$i\_s = \text{floor}(\text{UE\_ID}/N) \text{ mod } Ns \quad \text{(Eq. 2)}$$

Here, the additional parameter Ns=max (1, nB/T).

In order to ensure that paging is scheduled during an aggressive-contention eDRS subframe, one or more of the paging parameters may be specially configured based on the aggressive-contention eDRS periodicity to align all PFs with a radio frame containing an aggressive-contention eDRS subframe and to align all POs with an aggressive contention eDRS subframe therein, which is substantially guaranteed to be a TXOP for the access point 110. For example, the nB parameter may be set to $(T/T_{AC-eDRS})$ to match the PF periodicity with the aggressive-contention eDRS periodicity. In the illustrated example, where the aggressive-contention eDRS periodicity is set to 4 radio frames (i.e., $T_{AC-eDRs}=4$) in FIG. 19, nB may be set to nB=T/4=8, and hence, N=min(T, T/4)=T/4=8 and Ns=max(1, ¼)=1. Accordingly, the location of a given PF will be at SFN mod T=4*(UE_ID mod T/4)=a multiple of 4, which aligns with radio frames containing an aggressive-contention eDRS subframe, and the location of a given PO will be at i_s=floor (UE_ID/8) mod 1=0, which aligns with an aggressive-contention eDRS subframe, where the access point 110 is most likely to capture the communication medium 140.

Figure 20:
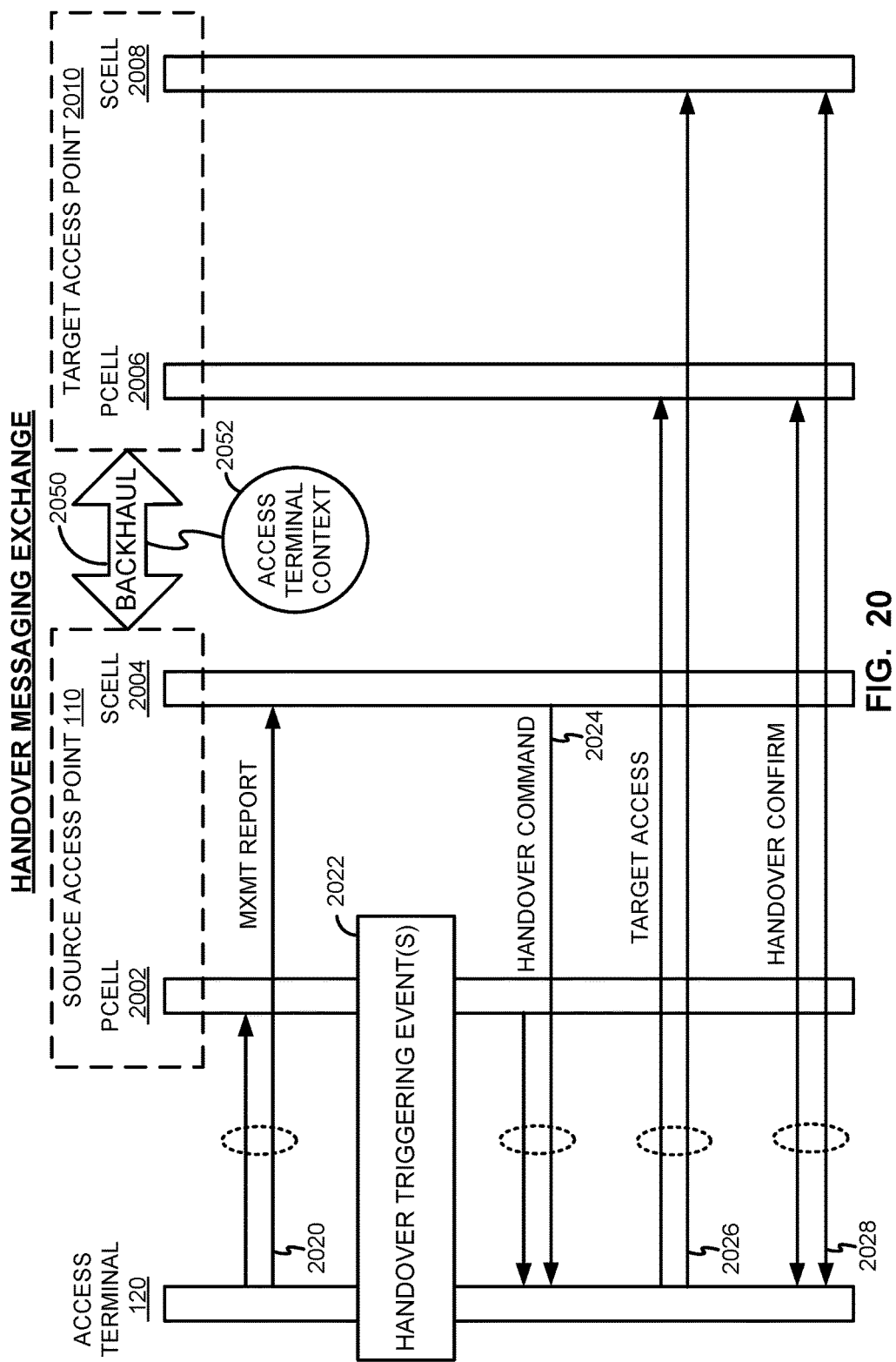
FIG. 20 is a signaling flow diagram illustrating example aspects of handover procedures.

FIG. 20 is a signaling flow diagram illustrating example aspects of handover procedures that may be used in conjunction with the virtual TDD frame structure of FIG. 2. In this example, the access terminal 120 is operating in a connected state with the access point 110, which serves as a source access point for the handover procedure. The source access point 110 provides service over the communication medium 140 via two cells, including a PCell 2002 and an SCell 2004 on respective component carriers. A neighboring access point 2010 operating nearby serves as a target access point for the handover procedure. The target access point 2010 similarly provides service over the communication medium 140 via two cells, including a PCell 2006 and an SCell 2008 on respective component carriers. It will be appreciated that the illustrated signaling is a generalization shown only in relevant part, and that certain illustrated signaling may be omitted while other signaling may be added for a given handover procedure implementation. For example, whereas a backward handover procedure may include an exchange of certain handover related information between the access terminal 120 and the source access point 110, a forward handover procedure may omit this signaling or include an exchange of similar or substitute handover related information between the access terminal 120 and the target access point 2010.

During its connection with the source access point 110, the access terminal 120 performs and reports various signaling measurements (signaling 2020). For example, the access terminal 120 may monitor the signal strength/quality (e.g., Received Signal Strength Indicator (RSSI), Reference Signal Received Power (RSRP), etc.) of its serving cell (e.g., the PCell 2002 of the source access point 110) and any candidate neighbor cells (e.g., the PCell 2006 of the target access point 2010). As described in more detail above, the measurements may be performed at one or more eDRS subframes based on the virtual TDD frame structure of FIG. 2.

In some designs, it may be advantageous to perform inter-frequency measurements using a separate receiver chain (e.g., a second instance of a primary RAT transceiver) rather than rely on measurement gap scheduling. In other designs, when measurements gaps are employed, they may be scheduled to align with one or more eDRS subframes (e.g., made relatively short and frequent). In addition, frame structure timing may be offset from one component carrier to the next such that their respective eDRS subframes are made non-overlapping, thereby allowing both inter-frequency and intra-frequency measurements to be performed without conflict.

Returning to FIG. 20, at some point, a handover triggering event may be detected (block 2022) based on the signaling measurements. For example, an intra-frequency triggering event such as an LTE "A3" event may be detected when the signal strength/quality of an intra-frequency neighbor cell exceeds that of the serving cell by a threshold for a threshold amount of time (e.g., 3 dB for 320 ms). As another example, an inter-frequency triggering event such as an LTE "A2" event may be detected when the signal strength/quality of the serving cell drops below a threshold (e.g., −118 dB). As another example, an inter-frequency triggering event such as an LTE "A4" event may be detected when the signal strength/quality of an inter-frequency neighbor cell exceeds another threshold.

In response to the detection of a handover triggering event (block 2022), the source access point 110 may send a handover command (e.g., RRC Connection Reconfiguration message) to the access terminal 120 (signaling 2024) instructing the access terminal 120 to move over to the target access point 2010. In response or independently, the access terminal 120 may then begin access procedures (e.g., RACH, RRC Connection Reestablishment Request, etc.) for connecting to the target access point 2010 (signaling 2026). Once the access terminal 120 has connected to the target access point 2010, they may exchange a handover confirmation (e.g., RRC Connection Reconfiguration Complete, RRC Connection Reestablishment, RRC Connection Establishment Complete+Reconfiguration, etc.) to complete the handover (signaling 2028).

As shown in FIG. 20, various handover signaling may be made more robust to address contention and interference issues that may arise on the communication medium 140 by configuring their transmission on alternative or even multiple component carriers. For example, the measurement report signaling 2020 may be sent from the access terminal 120 to the source access point 110 via the PCell 2002, the SCell 2004, or both. As another example, the handover command signaling 2024 may be sent from the source access point 110 to the access terminal 120 via the PCell 2002, the SCell 2004, or both. As another example, the access signaling 2026 may be sent from the access terminal 120 to the target access point 2010 via the PCell 2006, the SCell 2008, or both. As another example, the handover confirm signaling 2028 may be exchanged between the target access point 2010 and the access terminal 120 via the PCell 2006, the SCell 2008, or both.

Similarly, to more robustly maintain synchronization, the access terminal may also monitor synchronization signaling (e.g., Radio Link Monitoring (RLM)) via the PCell 2002, the SCell 2004, or both for the source access point 110 and the PCell 2006, the SCell 2008, or both for the target access point 2010.

In addition to over-the-air signaling, the source access point 110 and the target access point 2010 may exchange various signaling via a backhaul 2050 (e.g., an X2 connection) to facilitate the handover process. For example, the source access point 110 may send to the target access point 2010 access terminal context information 2052 for the access terminal 120, such as access terminal state information, security information, access terminal capability information, the identities of the access terminal-associated logical connections, and so on.

Various backhaul handover signaling may also be made more robust to address contention and latency issues that may arise on the communication medium 140 by exchanging setup information early, in anticipation of handover triggering. For example, the source access point 110 may predictively provide the access terminal context 2052 to the target access point 2010 before handover beings to prepare the target access point 2010 for a potential handover. The exchange may be prompted by information in the measurement reports (signaling 2020). For example, the exchange may be prompted when the signal strength/quality of the serving access point 110 drops below a handover warning threshold that is higher than the actual handover trigger threshold.

In some designs, to prioritize access to the communication medium 140 for handover signaling, the source access point 110, the target access point 2010, or the access terminal 120 may contend for the communication medium 140 using relatively aggressive contention parameters, as discussed in more detail above with respect to aggressive contention for eDRS subframes (e.g., a relatively low back-off threshold, a relatively small contention window, etc.).

In some designs, various handover messages may be further protected by a channel reservation message. For example, the access terminal 120 may send a channel reservation message, via the carriers corresponding to the PCell 2002, the SCell 2004, or both, before the measurement report signaling 2020. As another example, the source access point 110 may send a channel reservation message, via the carriers corresponding to the PCell 2002, the SCell 2004, or both, before the handover command signaling 2024. As another example, the access terminal 120 may send a channel reservation message, via the carriers corresponding to the PCell 2006, the SCell 2008, or both, before the access signaling 2026. As another example, the target access point 2010 may send a channel reservation message, via the carriers corresponding to the PCell 2006, the SCell 2008, or both, before the handover confirm signaling 2028. In the case where the access terminal 120 is not informed via the source access point 110 of the PCell and SCell RACH configuration and pairing for the target access point 2010, it may derive the pairing from broadcast information from the target access point 2010 informing access terminals of which cells correspond to a pair of cells for carrier aggregation purposes.

To mitigate interference to eDRS subframes from primary RAT devices associated with different operators, the virtual TDD frame structure of FIG. 2 may be staggered in time to avoid alignment of eDRS subframes across operators.

Figure 21:
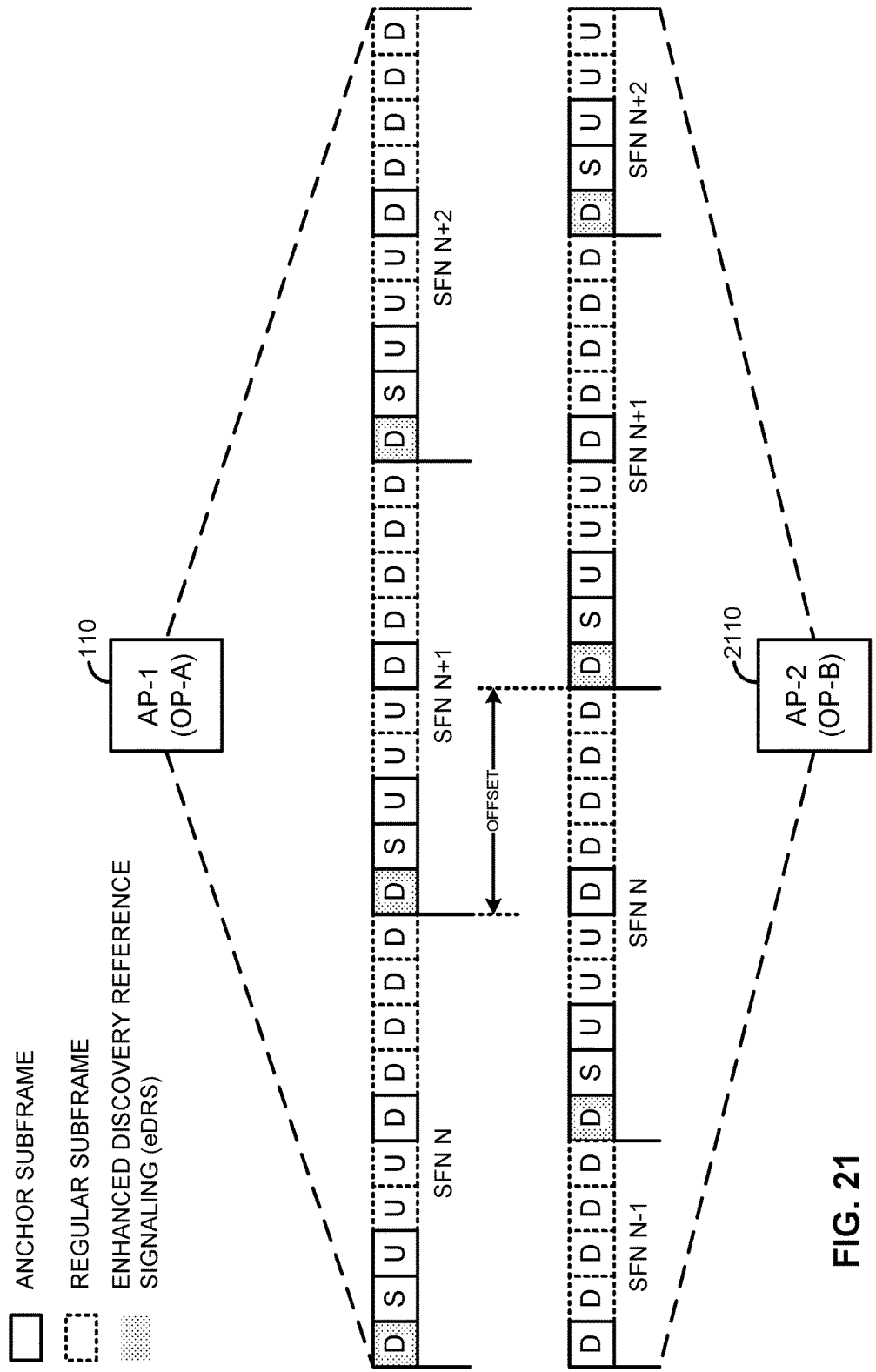
FIG. 21 illustrates an example of inter-operator frame staggering.

FIG. 21 illustrates an example of inter-operator frame staggering in accordance with the virtual TDD frame structure of FIG. 2. For illustration purposes, the access point 110 is shown as part of a coordinated system that includes another access point 2110 operating in accordance with the same but offset frame structure. The access point 110 and the access point 2110 are provided by different operators, with the access point 110 corresponding to a first operator A (OP-A) and the access point 2110 corresponding to a second operator B (OP-B).

As shown, the radio frames associated with the first operator A are offset by a number of subframes as compared to the radio frames associated with the second operator B. In the illustrated example, the offset is 5 subframes with the beginning of SFN N for operator B, for example, starting 5 subframes after the beginning of SFN N for operator A. Each operator may select an offset at random or as a function of operator-specific parameters (e.g., based on PLMN ID). This allows a reuse pattern of ¹⁄₁₀ for an eDRS subframe sent every radio frame, ¹⁄₂₀ for an eDRS subframe sent every other radio frame, and so on. In addition or as an alternative, eDRS signaling (e.g., PSS/SSS) may be staggered within an eDRS subframe and other signaling such as CRS may be offset in frequency (e.g., by up to 3 subcarriers).

Figure 22:
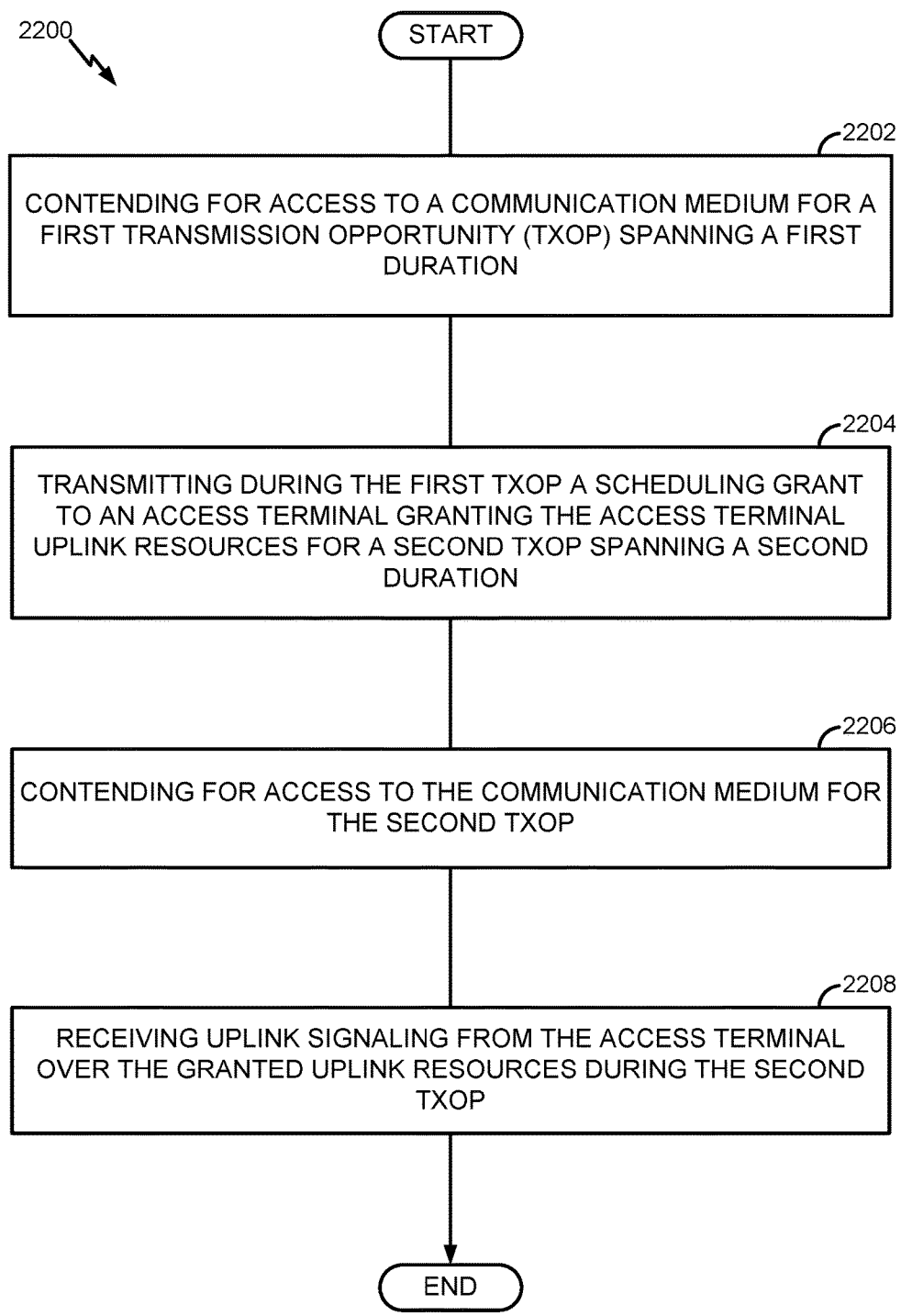
FIG. 22 is a flow diagram illustrating an example method of communication in accordance with the techniques described herein.

FIG. 22 is a flow diagram illustrating an example method of communication in accordance with the techniques described above. The method 2200 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may contend for access to a communication medium for a first TXOP spanning a first duration (block 2202). The access point may transmit during the first TXOP a scheduling grant to an access terminal granting the access terminal uplink resources for a second TXOP spanning a second duration (block 2204). The access point may contend for access to the communication medium for the second TXOP (block 2206). The access point may receive uplink signaling from the access terminal over the granted uplink resources during the second TXOP (block 2208).

As discussed in more detail above, the first TXOP and the second TXOP may be discontinuous in time such that there is an intervening time period between the first duration and the second duration. Further, the scheduling grant may configure the access terminal to ignore any uplink subframes scheduled for the intervening time period and to carryover the granted uplink resources to an uplink subframe during the second TXOP.

The access point may also transmit a channel reservation message reserving the communication medium for the first TXOP, the second TXOP, or both.

In some designs, the transmitting (block 2204) may comprise broadcasting the scheduling grant over a common control channel.

The access point may also retransmit, during the first TXOP, the scheduling grant to the access terminal. For example, the scheduling grant may be transmitted in a first downlink subframe of the first TXOP and retransmitted in a second downlink subframe of the first TXOP. The scheduling grant may also further grant the access terminal uplink resources for the first TXOP.

Figure 23:
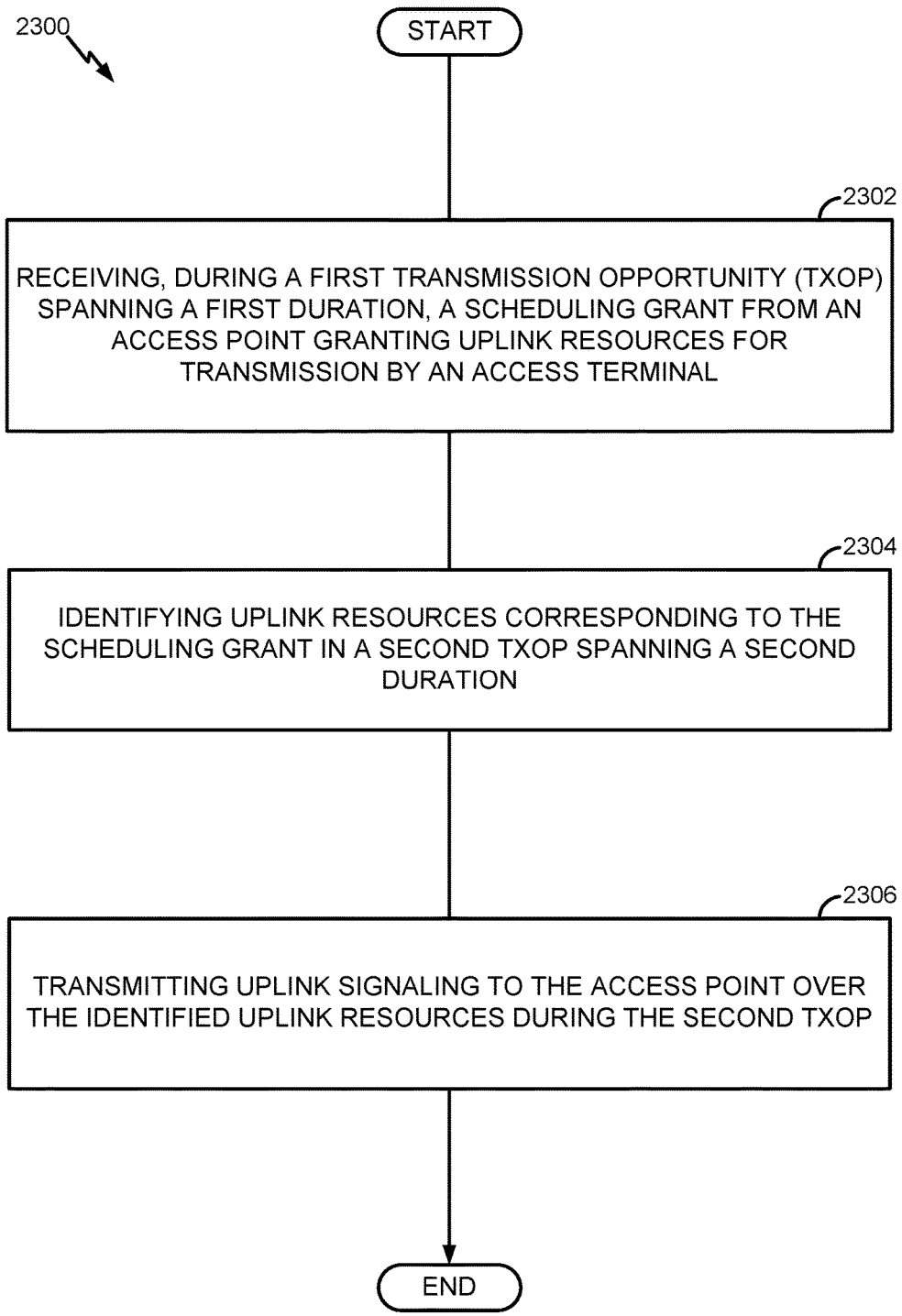
FIG. 23 is a flow diagram illustrating another example method of communication in accordance with the techniques described herein.

FIG. 23 is a flow diagram illustrating another example method of communication in accordance with the techniques described above. The method 2300 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive, during a first TXOP spanning a first duration, a scheduling grant from an access point granting uplink resources for transmission by an access terminal (block 2302). The access terminal may identify uplink resources corresponding to the scheduling grant in a second TXOP spanning a second duration (block 2304). The access terminal may transmit uplink signaling to the access point over the identified uplink resources during the second TXOP (block 2306).

As discussed in more detail above, the first TXOP and the second TXOP may be discontinuous in time such that there is an intervening time period between the first duration and the second duration. Further, the access terminal may ignore any uplink subframes scheduled for the intervening time period and carryover the granted uplink resources to an uplink subframe during the second TXOP.

In some designs, the access terminal may receive the scheduling grant over a common control channel. The access terminal may also receive, during the first TXOP, a retransmission of the scheduling grant from the access point. For example, the scheduling grant may be received in a first downlink subframe of the first TXOP and the retransmission of the scheduling grant may be received in a second downlink subframe of the first TXOP. The access terminal may also identify uplink resources corresponding to the scheduling grant in the first TXOP, and transmit uplink signaling to the access point over the identified uplink resources during the first TXOP.

Figure 24:
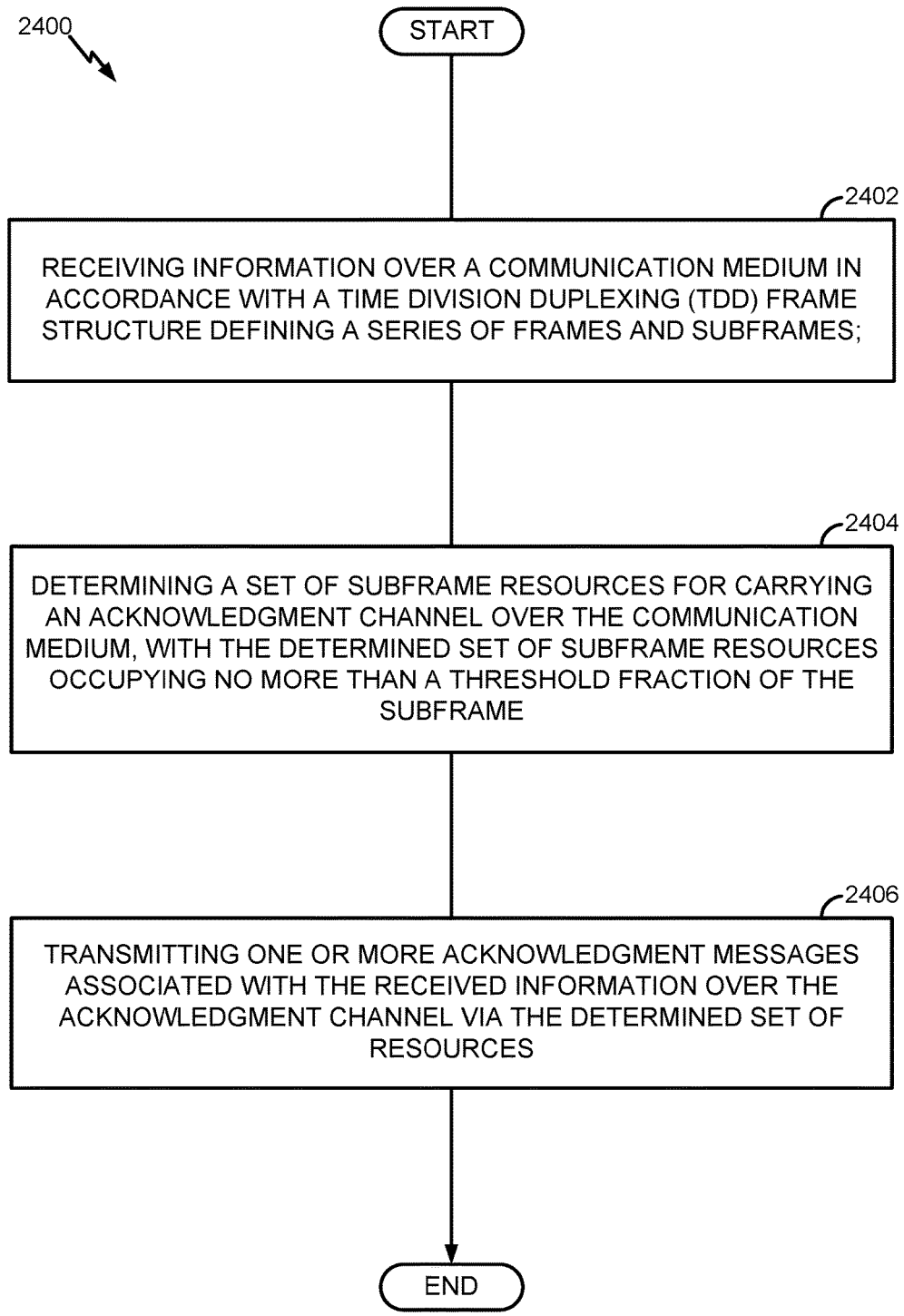
FIG. 24 is a flow diagram illustrating another example method of communication in accordance with the techniques described herein.

FIG. 24 is a flow diagram illustrating another example method of communication in accordance with the techniques described above. The method 2400 may be performed, for example, by an access point (e.g., the access point 110 illustrated in FIG. 1) or an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point or access terminal may receive information over a communication medium in accordance with a TDD frame structure defining a series of frames and subframes (block 2402). The access point or access terminal may determine a set of subframe resources for carrying an acknowledgment channel over the communication medium, with the determined set of subframe resources occupying no more than a threshold fraction of the subframe (block 2404). The access point or the access terminal may transmit one or more acknowledgment messages associated with the received information over the acknowledgment channel via the determined set of subframe resources (block 2406).

As discussed in more detail above, the threshold fraction of the subframe may comprise, for example, two or fewer OFDM symbol periods. The determined set of subframe resources may also be spread in frequency over one or more interleaved blocks of OFDM tones. As another example, the threshold fraction of the subframe may correspond to a contention-free period of time. The contention-free period of time may span, for example, 5% or less of a duration of a frame defined by the TDD frame structure.

The receiving (block 2404) may comprise receiving information on a first group of one or more downlink subframes and receiving information on a second group of one or more downlink subframes, and the transmitting (block 2406) may comprise transmitting an acknowledgment message on a first uplink subframe acknowledging the information received on the first group of one or more downlink subframes, and transmitting an acknowledgment message on a second uplink subframe after the first uplink subframe acknowledging the information received on the second group of one or more downlink subframes and the information received on the first group of one or more downlink subframes.

The access point, upon determining that the information is not received successfully during a first TXOP, may transmit a positive acknowledgment message associated with the information to an access terminal over the acknowledgment channel and refrain from transmitting any transmission grants to the access terminal over a common control channel. The access point may then receive, during a second TXOP, a retransmission of the information. The first TXOP and the second TXOP may be discontinuous in time.

Figure 25:
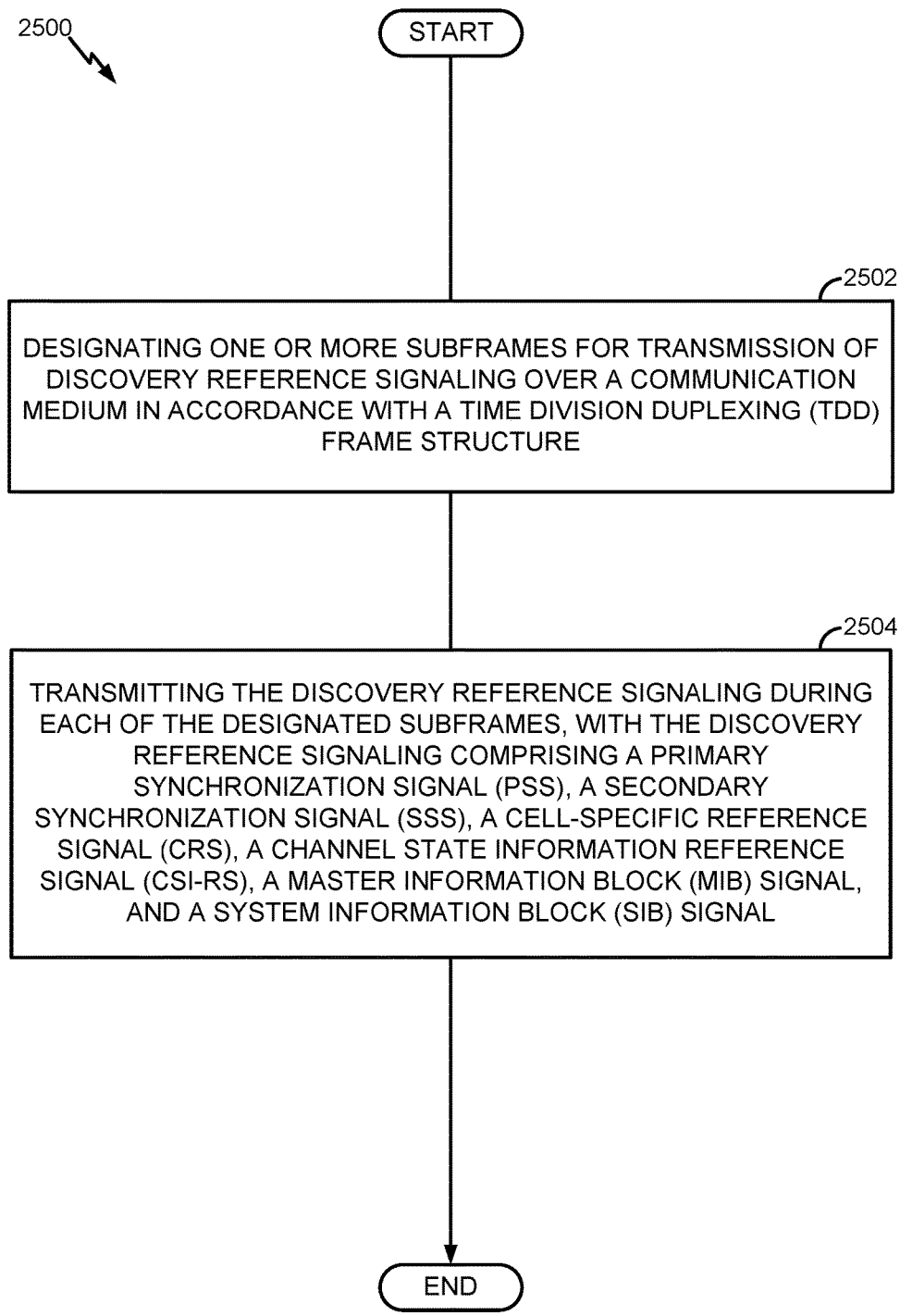
FIG. 25 is a flow diagram illustrating another example method of communication in accordance with the techniques described herein.

FIG. 25 is a flow diagram illustrating another example method of communication in accordance with the techniques described above. The method 2500 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may designate one or more subframes for transmission of discovery reference signaling over a communication medium in accordance with a TDD frame structure (block 2502). The access point may transmit the discovery reference signaling during each of the designated subframes, with the discovery reference signaling comprising a PSS, a SSS, a CRS, a CSI-RS, a MIB signal, and a SIB signal (block 2504).

As discussed in more detail above, the designated subframes may be scheduled to occur periodically. For example, the designated subframes may be scheduled to occur once during each frame of the TDD frame structure.

In some designs, the access point may set an aggressive contention periodicity for the discovery reference signaling and select one or more contention parameters for each of the designated subframes based on a timing of the subframe in relation to the aggressive contention periodicity. The access point may contend for access to the communication medium for each of the designated subframes based on the one or more contention parameters selected for the subframe and selectively transmit the discovery reference signaling during each of the designated subframes based on the contending. The one or more contention parameters may comprise, for example, a backoff threshold, a contention window size, or a combination thereof. Here, a higher backoff threshold may be selected for a subframe that aligns with the aggressive contention periodicity than for a subframe that does not align with the aggressive contention periodicity, a shorter contention window may be selected for a subframe that aligns with the aggressive contention periodicity than for a subframe that does not align with the aggressive contention periodicity, or a combination thereof.

In some designs, the SSS may comprise an enhanced SSS configured to be transmitted at least twice during each designated subframe, and in some cases more than twice during each designated subframe.

For generality, the access point 110 and the access terminal 120 are shown in FIG. 1 only in relevant part as including the medium access manager 112 and the medium access manager 122, respectively. It will be appreciated, however, that the access point 110 and the access terminal 120 may be configured in various ways to provide or otherwise support the contention techniques discussed herein.

Figure 26:
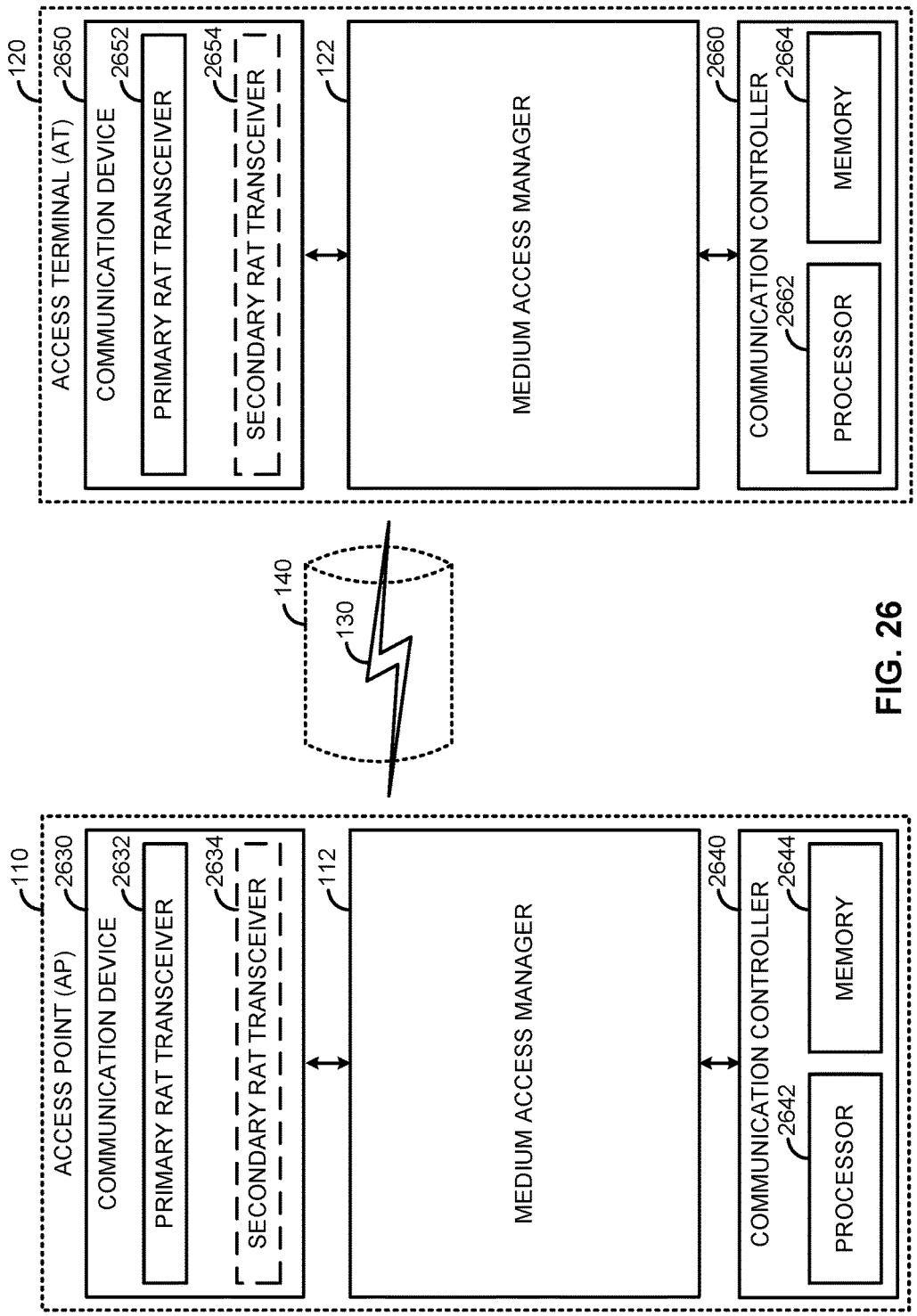
FIG. 26 is a device-level diagram illustrating example components of an access point and an access terminal in more detail.

FIG. 26 is a device-level diagram illustrating example components of the access point 110 and the access terminal 120 of the primary RAT system 100 in more detail. As shown, the access point 110 and the access terminal 120 may each generally include a wireless communication device (represented by the communication devices 2630 and 2650) for communicating with other wireless nodes via at least one designated RAT. The communication devices 2630 and 2650 may be variously configured for transmitting and encoding signals, and, conversely, for receiving and decoding signals in accordance with the designated RAT (e.g., messages, indications, information, pilots, and so on).

The communication devices 2630 and 2650 may include, for example, one or more transceivers, such as respective primary RAT transceivers 2632 and 2652, and, in some designs, (optional) co-located secondary RAT transceivers 2634 and 2654, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 2640 and 2660) for controlling operation of their respective communication devices 2630 and 2650 (e.g., directing, modifying, enabling, disabling, etc.). The communication controllers 2640 and 2660 may include one or more processors 2642 and 2662, and one or more memories 2644 and 2664 coupled to the processors 2642 and 2662, respectively. The memories 2644 and 2664 may be configured to store data, instructions, or a combination thereof, either as on-board cache memory, as separate components, a combination, etc. The processors 2642 and 2662 and the memories 2644 and 2664 may be standalone communication components or may be part of the respective host system functionality of the access point 110 and the access terminal 120.

It will be appreciated that the medium access manager 112 and the medium access manager 122 may be implemented in different ways. In some designs, some or all of the functionality associated therewith may be implemented by or otherwise at the direction of at least one processor (e.g., one or more of the processors 2642 and/or one or more of the processors 2662) and at least one memory (e.g., one or more of the memories 2644 and/or one or more of the memories 2664). In other designs, some or all of the functionality associated therewith may be implemented as a series of interrelated functional modules.

Figure 27:
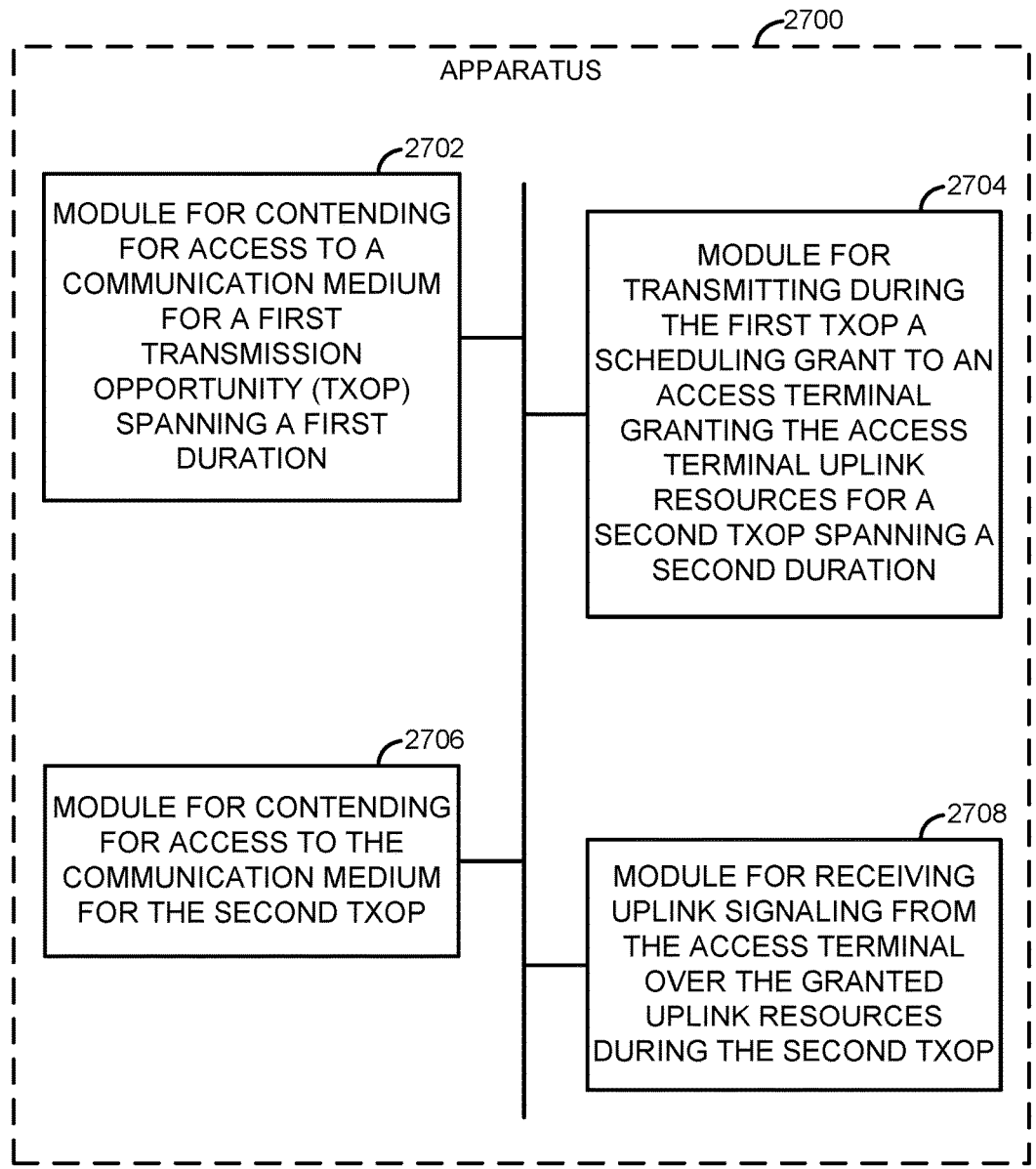
FIG. 27 illustrates an example apparatus represented as a series of interrelated functional modules.

FIG. 27 illustrates an example apparatus for implementing the medium access manager 112 and/or the medium access manager 122 represented as a series of interrelated functional modules. In the illustrated example, the apparatus 2700 includes a module for contending 2702, a module for transmitting 2704, a module for contending 2706, and a module for receiving 2708.

The module for contending 2702 may be configured to contend for access to a communication medium for a first TXOP spanning a first duration. The module for transmitting 2704 may be configured to transmit during the first TXOP a scheduling grant to an access terminal granting the access terminal uplink resources for a second TXOP spanning a second duration. The module for contending 2706 may be configured to contend for access to the communication medium for the second TXOP. The module for receiving 2708 may be configured to receive uplink signaling from the access terminal over the granted uplink resources during the second TXOP.

Figure 28:
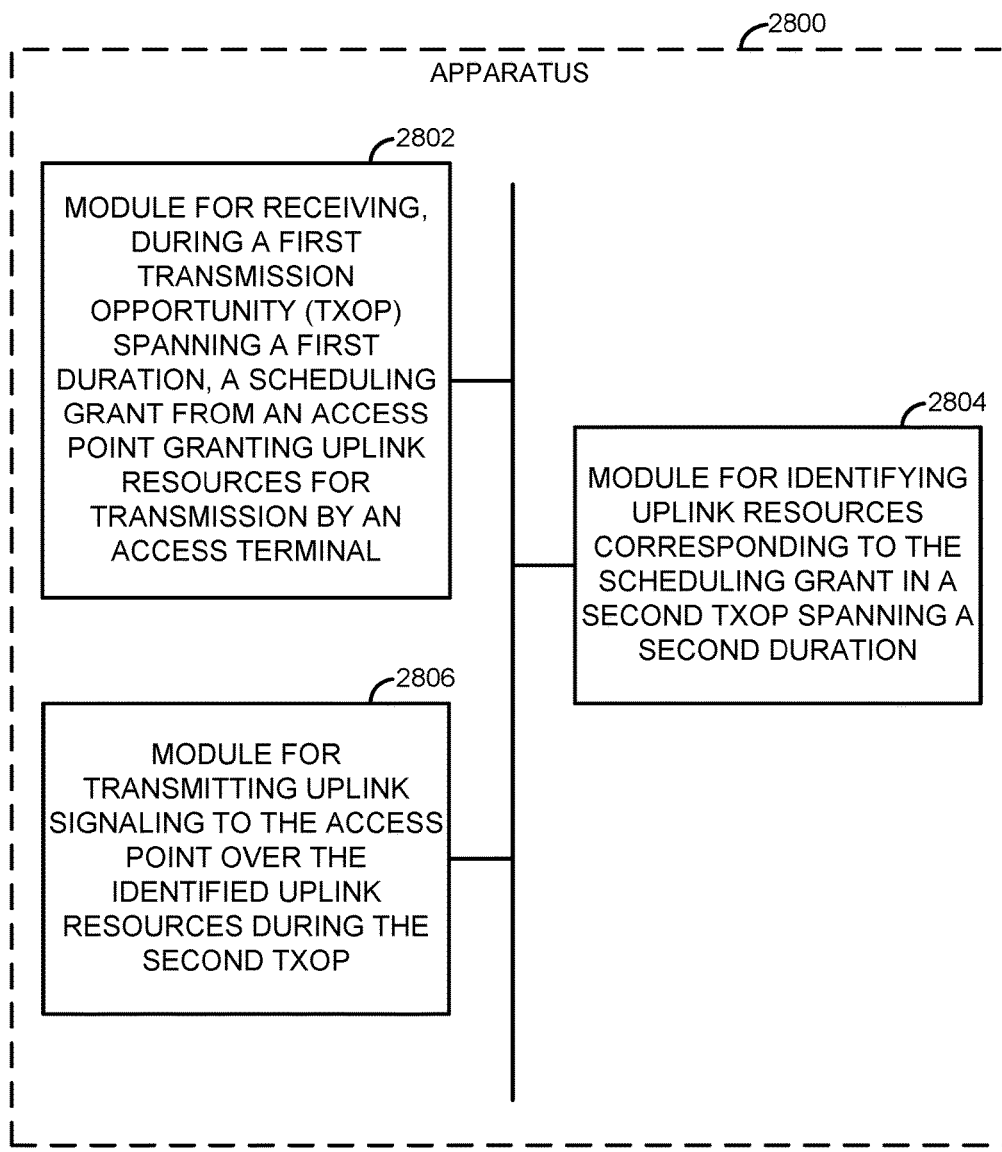
FIG. 28 illustrates another example apparatus represented as a series of interrelated functional modules.

FIG. 28 illustrates another example apparatus for implementing the medium access manager 122 represented as a series of interrelated functional modules. In the illustrated example, the apparatus 2800 includes a module for receiving 2802, a module for identifying 2804, and a module for transmitting 2806.

The module for receiving 2802 may be configured to receive, during a first TXOP spanning a first duration, a scheduling grant from an access point granting uplink resources for transmission by an access terminal. The module for identifying 2804 may be configured to identify uplink resources corresponding to the scheduling grant in a second TXOP spanning a second duration. The module for transmitting 2806 may be configured to transmit uplink signaling to the access point over the identified uplink resources during the second TXOP.

Figure 29:
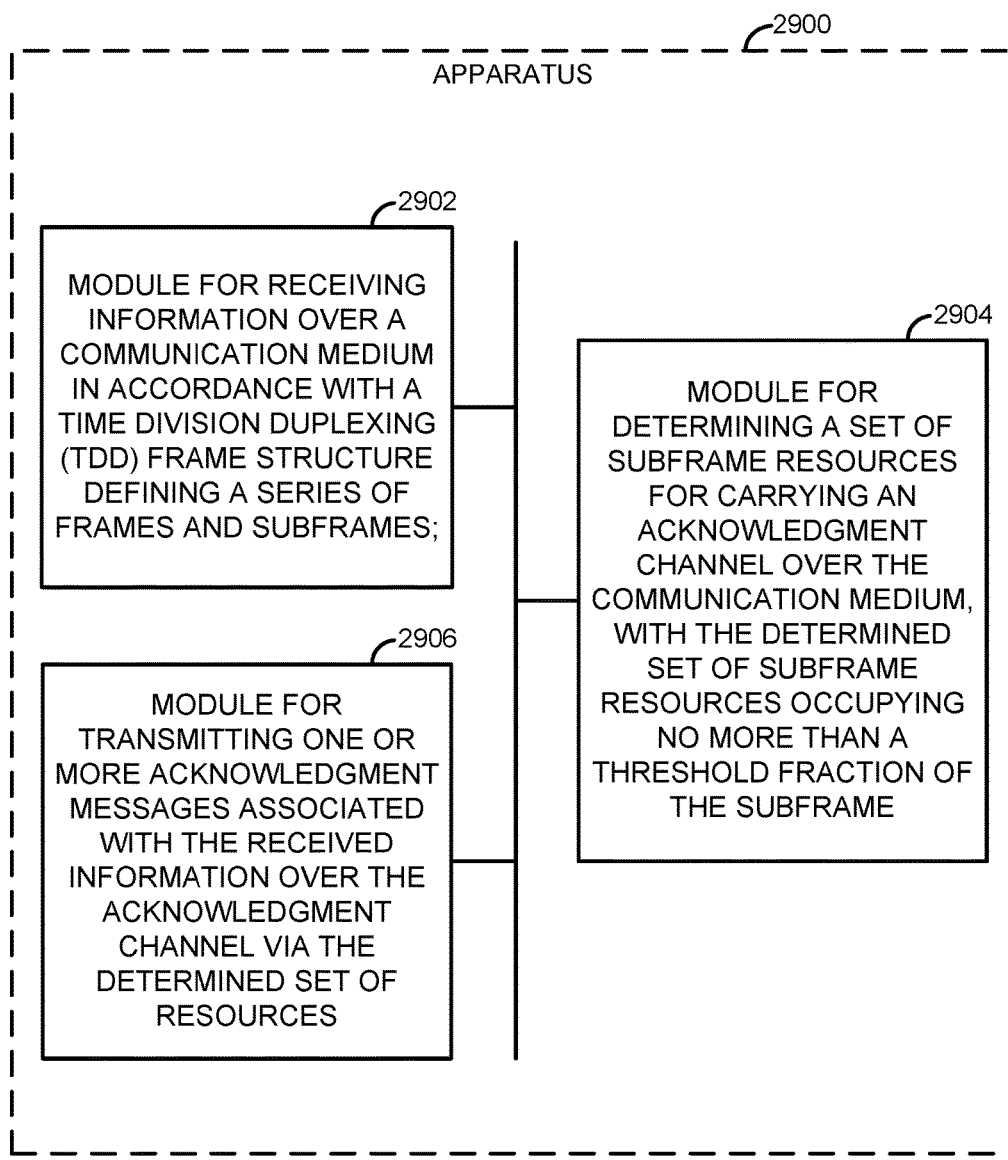
FIG. 29 illustrates another example apparatus represented as a series of interrelated functional modules.

FIG. 29 illustrates another example apparatus for implementing the medium access manager 112 and/or the medium access manager 122 represented as a series of interrelated functional modules. In the illustrated example, the apparatus 2900 includes a module for receiving 2902, a module for determining 2904, and a module for transmitting 2906.

The module for receiving 2902 may be configured to receive information over a communication medium in accordance with a TDD frame structure defining a series of frames and subframes. The module for determining 2904 may be configured to determine a set of subframe resources for carrying an acknowledgment channel over the communication medium, with the determined set of subframe resources occupying no more than a threshold fraction of the subframe. The module for transmitting 2906 may be configured to transmit one or more acknowledgment messages associated with the received information over the acknowledgment channel via the determined set of subframe resources.

Figure 30:
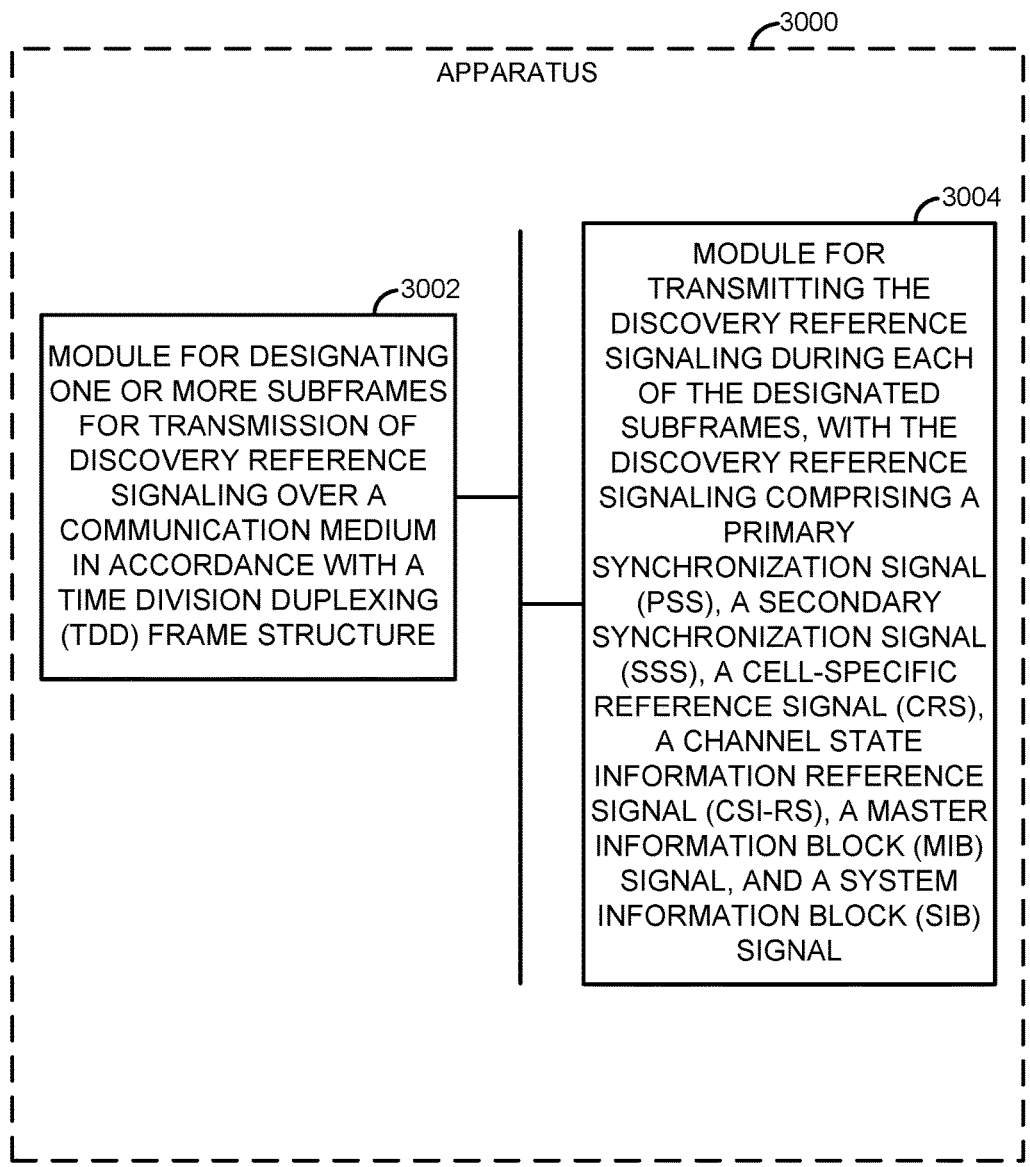
FIG. 30 illustrates another example apparatus represented as a series of interrelated functional modules.

FIG. 30 illustrates another example apparatus for implementing the medium access manager 112 represented as a series of interrelated functional modules. In the illustrated example, the apparatus 3000 includes a module for designating 3002 and a module for transmitting 3004.

The module for designating 3002 may be configured to designate one or more subframes for transmission of discovery reference signaling over a communication medium in accordance with a TDD frame structure. The module for transmitting 3004 may be configured to transmit the discovery reference signaling during each of the designated subframes, with the discovery reference signaling comprising a PSS, a SSS, a CRS, a CSI-RS, a MIB signal, and a SIB signal.

The functionality of the modules of FIGS. 27-30 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 27-30, as well as other components and functions described herein, may be implemented using any suitable means. Such means also may be implemented, at least in part, using corresponding structure as taught herein. For example, the components described above in conjunction with the "module for" components of FIGS. 27-30 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 27-30 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
    contending for access to a communication medium for a first transmission opportunity (TXOP) spanning a first duration;
    transmitting a first channel reservation message reserving the communication medium for the first TXOP;
    transmitting during the first TXOP a scheduling grant to an access terminal granting the access terminal uplink resources for a second TXOP spanning a second duration;
    contending for access to the communication medium for the second TXOP;
    transmitting a second channel reservation message reserving the communication medium for the second TXOP; and
    receiving uplink signaling from the access terminal over the granted uplink resources during the second TXOP.

2. The method of claim 1, wherein the scheduling grant configures the access terminal to:
    ignore any uplink subframes scheduled for an intervening time period between the first duration and the second duration, wherein access to the communication medium is yielded during the intervening time period;
    carryover the granted uplink resources to an uplink subframe during the second TXOP;
    transmit during the second TXOP in response to reception of the second channel reservation message.

3. The method of claim 1, wherein the transmitting comprises broadcasting the scheduling grant over a common control channel.

4. The method of claim 1, further comprising retransmitting, during the first TXOP, the scheduling grant to the access terminal.

5. The method of claim 4, wherein the scheduling grant is transmitted in a first downlink subframe of the first TXOP and retransmitted in a second downlink subframe of the first TXOP.

6. A communication apparatus, comprising:
    at least one processor;
    at least one memory coupled to the at least one processor, the at least one processor and the at least one memory being configured to contend for access to a communication medium for a first transmission opportunity (TXOP) spanning a first duration; and
    at least one transceiver configured to:
        transmit a first channel reservation message reserving the communication medium for the first TXOP; and
        transmit during the first TXOP a scheduling grant to an access terminal granting the access terminal uplink resources for a second TXOP spanning a second duration
    wherein the at least one processor and the at least one memory are further configured to contend for access to the communication medium for the second TXOP; and
    wherein the at least one transceiver is further configured to:
        transmit a second channel reservation message reserving the communication medium for the second TXOP; and
        receive uplink signaling from the access terminal over the granted uplink resources during the second TXOP.

7. The apparatus of claim 6, wherein the scheduling grant configures the access terminal to:
    ignore any uplink subframes scheduled for an intervening time period between the first duration and the second duration, wherein access to the communication medium is yielded during the intervening time period;
    carryover the granted uplink resources to an uplink subframe during the second TXOP; and
    transmit during the second TXOP in response to reception of the second channel reservation message.

8. The apparatus of claim 6, wherein the at least one transceiver is further configured to broadcast the scheduling grant over a common control channel.

9. The apparatus of claim 6, wherein the at least one transceiver is further configured to retransmit, during the first TXOP, the scheduling grant to the access terminal.

10. The apparatus of claim 9, wherein the at least one transceiver is further configured to transmit the scheduling grant in a first downlink subframe of the first TXOP and to retransmit the scheduling grant in a second downlink subframe of the first TXOP.

11. A communication method, comprising:
receiving a first channel reservation message reserving the communication medium for a first transmission opportunity (TXOP) spanning a first duration;
receiving a scheduling grant from an access point during the first TXOP, wherein the scheduling grant grants uplink resources for a second TXOP spanning a second duration;
identifying uplink resources corresponding to the scheduling grant in the second TXOP;
receiving a second channel reservation message reserving the communication medium for the second TXOP; and
transmitting uplink signaling to the access point over the identified uplink resources during the second TXOP.

12. The method of claim 11, further comprising:
ignoring any uplink subframes scheduled for an intervening time period between the first duration and the second duration, wherein access to the communication medium is yielded during the intervening time period;
carrying over the granted uplink resources to an uplink subframe during the second TXOP; and
transmitting the uplink signaling during the second TXOP in response to reception of the second channel reservation message.

13. The method of claim 11, wherein the receiving comprises receiving the scheduling grant over a common control channel.

14. The method of claim 11, further comprising receiving, during the first TXOP, a retransmission of the scheduling grant from the access point.

15. The method of claim 14, wherein the scheduling grant is received in a first downlink subframe of the first TXOP and the retransmission of the scheduling grant is received in a second downlink subframe of the first TXOP.

16. The method of claim 11, further comprising:
identifying uplink resources corresponding to the scheduling grant in the first TXOP; and
transmitting uplink signaling to the access point over the identified uplink resources during the first TXOP.

17. A communication apparatus, comprising:
at least one transceiver configured to:
receive a first channel reservation message reserving the communication medium for a first transmission opportunity (TXOP) spanning a first duration; and
receive a scheduling grant from an access point during the first TXOP, wherein the scheduling grant grants uplink resources for a second TXOP spanning a second duration;
at least one memory coupled to the at least one processor, the at least one processor and the at least one memory being configured to identify uplink resources corresponding to the scheduling grant in the second TXOP,
wherein the at least one transceiver is further configured to:
receive a second channel reservation message reserving the communication medium for the second TXOP; and
transmit uplink signaling to the access point over the identified uplink resources during the second TXOP.

18. The apparatus of claim 17, wherein the at least one processor and the at least one memory are further configured to:
ignore any uplink subframes scheduled for an intervening time period between the first duration and the second duration, wherein access to the communication medium is yielded during the intervening time period;
carryover the granted uplink resources to an uplink subframe during the second TXOP; and
transmit the uplink signaling during the second TXOP in response to reception of the second channel reservation message.

19. The apparatus of claim 17, wherein the at least one transceiver is further configured to receive the scheduling grant over a common control channel.

20. The apparatus of claim 17, wherein the at least one transceiver is further configured to receive, during the first TXOP, a retransmission of the scheduling grant from the access point.

21. The apparatus of claim 20, wherein the at least one transceiver is further configured to receive the scheduling grant in a first downlink subframe of the first TXOP and to receive the retransmission of the scheduling grant in a second downlink subframe of the first TXOP.

22. The apparatus of claim 17, wherein:
the at least one processor and the at least one memory are further configured to identify uplink resources corresponding to the scheduling grant in the first TXOP; and
the at least one transceiver is further configured to transmit uplink signaling to the access point over the identified uplink resources during the first TXOP.

* * * * *